United States Patent
Ide

(10) Patent No.: US 10,654,481 B2
(45) Date of Patent: May 19, 2020

(54) VEHICLE DRIVING SUPPORT APPARATUS

(71) Applicant: TOYOTA JIDOSHA KABUSHIKI KAISHA, Toyota-shi, Aichi-ken (JP)

(72) Inventor: Hirohito Ide, Tokyo (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/106,175

(22) Filed: Aug. 21, 2018

(65) Prior Publication Data

US 2019/0061758 A1 Feb. 28, 2019

(30) Foreign Application Priority Data

Aug. 23, 2017 (JP) ................. 2017-159936

(51) Int. Cl.
*B60K 31/00* (2006.01)
*B60W 10/20* (2006.01)
*B60W 30/16* (2020.01)
*B60W 30/165* (2020.01)

(52) U.S. Cl.
CPC ......... *B60W 30/16* (2013.01); *B60K 31/0008* (2013.01); *B60W 10/20* (2013.01); *B60W 30/165* (2013.01); *B60K 2031/005* (2013.01); *B60K 2031/0016* (2013.01); *B60K 2031/0025* (2013.01); *B60K 2031/0041* (2013.01); *B60W 2550/30* (2013.01); *B60W 2550/306* (2013.01); *B60W 2550/308* (2013.01); *B60W 2710/20* (2013.01); *B60W 2720/106* (2013.01); *B60W 2750/308* (2013.01)

(58) Field of Classification Search
CPC ........ B60K 31/0008; B60K 2031/0016; B60K 2031/0025; B60K 2031/0041; B60K 2031/005; B60W 10/20; B60W 30/16; B60W 30/165; B60W 2550/30; B60W 2550/306; B60W 2550/308; B60W 2720/106; B60W 2720/308
See application file for complete search history.

(56) References Cited

U.S. PATENT DOCUMENTS 9,950,707 B2 * 4/2018 Tan .................. B60W 50/0098
2005/0270145 A1 12/2005 Kataoka et al.
2006/0025918 A1 2/2006 Saeki
(Continued)

FOREIGN PATENT DOCUMENTS

JP 2000-057498 A 2/2000
JP 2004-322916 A 11/2004
(Continued)

*Primary Examiner* — Robert T Nguyen
(74) *Attorney, Agent, or Firm* — Sughrue Mion, PLLC

(57) ABSTRACT

A driving support ECU performs an inter-vehicle-distance control and a following-travel steering control. When an inter-vehicle-distance target vehicle and a following-travel steering target vehicle are the same specific other vehicle as each other, and there is a potential cutting-in vehicle between an own vehicle and the specific other vehicle, the driving support ECU newly specifies the potential cutting-in vehicle as the inter-vehicle-distance target vehicle at a first time point in a cutting-in period and newly specifies the potential cutting-in vehicle as the following-travel steering target vehicle at a second time point in the cutting-in period.

4 Claims, 9 Drawing Sheets

(56) References Cited

U.S. PATENT DOCUMENTS

| | | | |
|---|---|---|---|
| 2016/0159353 A1* | 6/2016 | Yun | B60W 10/06 |
| | | | 701/93 |
| 2016/0339914 A1* | 11/2016 | Habu | B60W 30/12 |
| 2017/0232966 A1* | 8/2017 | Ishioka | B60W 30/18163 |
| | | | 701/96 |
| 2017/0344023 A1* | 11/2017 | Laubinger | G05D 1/0272 |
| 2019/0061758 A1* | 2/2019 | Ide | B60W 30/16 |
| 2019/0092331 A1* | 3/2019 | Ide | B60W 30/165 |
| 2019/0217861 A1* | 7/2019 | Kurahashi | B60W 30/162 |
| 2019/0308625 A1* | 10/2019 | Iimura | B60W 30/09 |

FOREIGN PATENT DOCUMENTS

| | | |
|---|---|---|
| JP | 2006-315491 A | 11/2006 |
| JP | 2008-195402 A | 8/2008 |
| JP | 4172434 B2 | 10/2008 |
| JP | 2009-190464 A | 8/2009 |
| JP | 4349210 B2 | 10/2009 |
| JP | 2010-006279 A | 1/2010 |
| JP | 4929777 B2 | 5/2012 |
| JP | 2014-148293 A | 8/2014 |

* cited by examiner $$L1: f(x) = ax^3 + bx^2 + cx + d$$

$$\text{CURVATURE RADIUS}: R(x) = \frac{(1 + 3ax^2 + 2bx + c)^{1.5}}{6ax + 2b}$$

$$\text{CURVATURE}: Cv(x) = \frac{6ax + 2b}{(1 + 3ax^2 + 2bx + c)^{1.5}}$$

$$1 >> 3ax^2 + 2bx + c$$
$$\tan\theta v \fallingdotseq \theta v$$

$Cv(x) = 6ax + 2b$
$Cv(0)(=Cv) = 2b$
$C(x')(=Cv') = 6a$
$\theta v = c$
$dv = d$

VEHICLE DRIVING SUPPORT APPARATUS

BACKGROUND OF THE INVENTION

1. Field of the Invention

The present invention relates to a vehicle driving support apparatus which performs a control for maintaining an inter-vehicle distance between an other vehicle (a preceding vehicle) which travels in front (ahead) of an own vehicle and the own vehicle at a target inter-vehicle distance and a control for causing the own vehicle to travel along a target traveling line determined/calculated based on a traveling trajectory of the preceding vehicle.

2. Description of the Related Art

A vehicle driving support apparatus, which has been conventionally known, performs a control for adjusting/changing an acceleration (including a deceleration) of an own vehicle in such a manner that an inter-vehicle distance of an other vehicle (an inter-vehicle-distance target vehicle) which travels in a front area of the own vehicle is maintained at a predetermined target inter-vehicle-distance. Hereinafter, the vehicle driving support apparatus is referred to as a "conventional apparatus". This control is also referred to as a "following-travel inter-vehicle-distance control" or an "inter-vehicle-distance control".

The conventional apparatus is configured to determine, when there is a vehicle (that is, a cutting-in vehicle) which is about to cut in between the own vehicle and the inter-vehicle-distance target vehicle while performing the inter-vehicle-distance control, whether or not a distance (that is, a lateral deviation amount) in a lane width direction between a center position in a lane (hereinafter, also referred to as an "own vehicle traveling lane") in which the own vehicle is traveling and a position of the cutting-in vehicle becomes smaller than a threshold.

Then, when the conventional apparatus has determined that the lateral deviation amount becomes smaller than the threshold, the conventional apparatus specifies the cutting-in vehicle as a new inter-vehicle-distance target vehicle (for example, refer to Japanese Patent Application Laid-Open No. 2000-57498).

Here, the inventor(s) of the present application has been developing a vehicle driving support apparatus which specifies a predetermined other vehicle traveling in the front area of the own vehicle as a following-travel steering target vehicle to control a steering angle (a turning angle) of the own vehicle in such a manner that the own vehicle can travel along a target traveling line determined based on a traveling trajectory of that following-travel steering target vehicle. It should be noted that such a steering angle control is also referred to as a "following-travel steering control".

When the vehicle driving support apparatus simultaneously performs both of the inter-vehicle-distance control and the following-travel steering control, it is considered that one (the same) other vehicle is used/set for both of the inter-vehicle-distance target vehicle and the following-travel steering target vehicle. However, it has been revealed that, if the same one another vehicle is used/set as each of those target vehicles of both of the two controls, the following problem is likely to occur while the cutting-in vehicle is cutting in ahead of the own vehicle.

That is, if a "timing at which the cutting-in vehicle is newly specified as "the target vehicle for the above two controls" is too early, a "relatively quick traveling behavior of the cutting-in vehicle" in a lane width direction is reflected in (or affect) the traveling trajectory used for determining the target traveling line, and thus, the following-travel steering control may not be able to cause the own vehicle to stably travel along an own vehicle traveling lane in which the own vehicle has been traveling.

In contrast, if "the timing at which the cutting-in vehicle is newly specified as "the target vehicle for the above two controls" is too late, the other vehicle which has been identified/used as the target vehicle is hidden by the cutting-in vehicle as seen from the own vehicle until that timing, and thus, accuracy of the target object information (for example, a longitudinal distance, a lateral position, and the like) of this target vehicle may degrade/decrease. Therefore, since accuracy of a "traveling trajectory of the target vehicle" generated based on the target object information degrades/decreases, the following-travel steering control may not be able to cause the own vehicle to stably travel along the own vehicle traveling lane. In addition, if the timing at which the cutting-in vehicle is newly specified as "the target vehicle for the above two controls" is too late, for example, when the cutting-in vehicle cuts in suddenly while decelerating, the "inter-vehicle distance between that cutting-in vehicle and the own vehicle" may become excessively short and/or the "inter-vehicle-distance control may cause the own vehicle to suddenly decelerate so that discomfort may be given to the driver".

SUMMARY OF THE INVENTION

The present invention has been made in order to solve the above-described problems. That is, one of objects of the present invention is to provide a vehicle driving support apparatus which can specify each of an inter-vehicle-distance target vehicle and a following-travel steering target vehicle at an appropriate timing so that an own vehicle can travel stably in the own vehicle traveling lane in which the own vehicle is traveling. Hereinafter, the vehicle driving support apparatus according to the present invention may also be referred to as the "present invention apparatus".

The present invention apparatus includes:

target object information acquiring means (10) for acquiring target object information including a longitudinal distance ($Df(x)$) and a lateral position ($Df(y)$) of each one or more of other vehicles with respect to an own vehicle (SV), the other vehicles traveling in a front area of the own vehicle; and traveling control means (10) for performing:

an inter-vehicle-distance control (refer to step 620) to specify a first vehicle (TV) from among one or more of the other vehicles as an inter-vehicle-distance target vehicle, and to control an acceleration of the own vehicle in such a manner that an inter-vehicle distance which is a longitudinal distance of the inter-vehicle-distance target vehicle with respect to the own vehicle is maintained at a predetermined inter-vehicle distance, and a following-travel steering control (refer to step 545) to specify a second vehicle (TV) from among one or more of the other vehicles as a following-travel steering target vehicle, and to generate a traveling trajectory (L1) of the following-travel steering target vehicle (refer to step 540) to control a steering angle of the own vehicle in such a manner that the own vehicle travels along a target traveling line determined based on the traveling trajectory.

While the inter-vehicle-distance target vehicle and the following-travel steering target vehicle are the same specific other vehicle as each other, and when there is a potential cutting-in vehicle having a possibility of cutting in between the own vehicle and the specific other vehicle, the traveling control means needs to change each of the inter-vehicle-distance target vehicles and the following-travel steering target vehicles from the specific other vehicle to the potential cutting-in vehicle.

In this case, as described above, if the timing at which the potential cutting-in vehicle is specified as each of the inter-vehicle-distance target vehicle and the following-travel steering target vehicle is not appropriate, the own vehicle is highly likely to be unable to travel in a vicinity of the center line of the own vehicle traveling lane stably.

In view of the above, the traveling control means is configured, when the first vehicle specified as the inter-vehicle-distance target vehicle and the second vehicle specified as the following-travel steering target vehicle are the same specific other vehicle (TV) as each other, and there is a potential cutting-in vehicle (CV) having a possibility of cutting in between the own vehicle and the specific other vehicle:

- to newly specify the potential cutting-in vehicle as the inter-vehicle-distance target vehicle at a first time point in a cutting-in period from a time point at which the potential cutting-vehicle starts cutting in to a time point at which the potential cutting-vehicle finishes cutting in (refer to a "Yes" determination at step 675, a "Yes" determination at step 810, and step 640); and
- to newly specify the potential cutting-in vehicle as the following-travel steering target vehicle at a second time point in the cutting-in period, wherein the second time point is set to arrive after the first time point arrives (refer to a "Yes" determination at step 575 and refer to step 535).

This allows the timing (a first time point) at which the potential cutting-in vehicle is specified as the inter-vehicle-distance target vehicle to become earlier than the timing (a second time point) at which the potential cutting-in vehicle is specified as the following-travel steering target vehicle. As a result, each of these timings becomes appropriate/suitable, so that the own vehicle can travel in the own vehicle traveling lane stably.

In one of aspects of the present invention apparatus, the traveling control means is configured:

- to specify a third vehicle as the potential cutting-in vehicle, when a longitudinal distance of the third vehicle with respect to the own vehicle (SV) is smaller than a longitudinal distance of the specific other vehicle with respect to the own vehicle (refer to a "Yes" determination at each of step 565 in FIG. 5 and step 665 in FIG. 6), wherein the third vehicle is a vehicle which is traveling in the front area of the own vehicle and which is one of the other vehicles other than the specific other vehicle;
- to newly specify the potential cutting-in vehicle as the inter-vehicle-distance target vehicle (refer to step 640 in FIG. 6), when a first condition becomes satisfied (refer to a "Yes" determination at step 675 in FIG. 6), the first condition including a condition to be satisfied when a determination distance (Dsy) becomes equal to or smaller than a predetermined inter-vehicle-distance control threshold (Daccth), wherein the determination distance is a distance in a lane width direction between the traveling trajectory (L1) of the specific other vehicle and the specified potential cutting-in vehicle; and
- to newly specify the potential cutting-in vehicle as the following-travel steering target vehicle (refer to step 535 in FIG. 5), when a second condition is satisfied (a "Yes" determination at step 575 in FIG. 5), the second condition including a condition to be satisfied when the determination distance becomes equal to or smaller than a predetermined following-travel steering control threshold (Dtjath) which is smaller than the inter-vehicle-distance control threshold.

According to the above-mentioned aspect, whether or not each of the first condition and the second condition is satisfied is determined based on the determination distance. Further, the inter-vehicle-distance control threshold is (set to be a value) greater than the following-travel steering control threshold. Therefore, the first time point at which the first condition becomes satisfied and the potential cutting-in vehicle is newly specified as the inter-vehicle-distance target vehicle becomes earlier than the second time point at which the second condition becomes satisfied and the potential cutting-in vehicle is newly specified as the following-travel steering target vehicle, without fail. As a result, each of these timings can become appropriate.

In one of aspects of the present invention apparatus, the traveling control means is configured:

- to specify a third vehicle as the potential cutting-in vehicle, when a longitudinal distance of the third vehicle with respect to the own vehicle is shorter than a longitudinal distance of the specific other vehicle with respect to the own vehicle (refer to a "Yes" determination each of step 565 in FIG. 7 and step 665 in FIG. 8), wherein the third vehicle is a vehicle which is traveling in the front area of the own vehicle and which is one of the other vehicles other than the specific other vehicle;
- to newly specify the potential cutting-in vehicle as the inter-vehicle-distance target vehicle (refer to step 640 in FIG. 8), when the potential cutting-in vehicle satisfies a predetermined condition (refer to a "Yes" determination at step 810 in FIG. 8); and
- to newly specify the potential cutting-in vehicle as the following-travel steering target vehicle (refer to step 535 in FIG. 7), when a specific condition becomes satisfied (refer to a "Yes" determination at step 575 in FIG. 7) after the potential cutting-in vehicle has already been newly specified as the inter-vehicle-distance target vehicle (refer to a "Yes" determination at step 710 in FIG. 7), the specific condition including a condition to be satisfied when a determination distance becomes equal to or smaller than a predetermined following-travel steering control threshold, wherein the determination distance is a distance in a lane width direction between the traveling trajectory (L1) of the specific other vehicle and the specified potential cutting-in vehicle.

According to the above-mentioned aspect, the potential cutting-in vehicle is newly specified as the following-travel steering target vehicle when the above specific condition is satisfied after the potential cutting-in vehicle is newly specified as the inter-vehicle-distance target vehicle. Therefore, the first time point at which the potential cutting-in vehicle is newly specified as the inter-vehicle-distance target vehicle becomes earlier than the second time point at which the potential cutting-in vehicle is newly specified as the following-travel steering target vehicle, without fail. As a result, each of these timings can become appropriate.

In one of aspects of the present invention apparatus, the target object information acquiring means is configured to acquire a lateral relative speed (Vfy) of each one or more of the other vehicles with respect to the own vehicle (refer to step 625 in FIG. 8), the other vehicles traveling in the front area of the own vehicle; and the traveling control means is configured to determine whether or not the predetermined condition is satisfied by using the lateral position of the potential cutting-in vehicle with respect to the own vehicle and the lateral relative speed of the potential cutting-in vehicle with respect to the own vehicle without using the determination distance (refer to step 810).

According to the above-mentioned aspect, the timing (the first time point) at which the potential cutting-in vehicle is specified as the inter-vehicle-distance target vehicle becomes more appropriate. This can reduce a possibility of necessity to cause the own vehicle to decelerate rapidly when the cutting-in vehicle appears.

BRIEF DESCRIPTION OF THE DRAWINGS

FIG. 3A is a plan view for illustrating the lane keeping control.

FIG. 3B is a numerical expression for explaining relationship between coefficients of a cubic function of a traveling trajectory and a curvature and the like.

FIG. 3C is the numerical expression for explaining the relationship between coefficients of the cubic function of the traveling trajectory and the curvature and the like.

DETAILED DESCRIPTION OF THE PREFERRED EMBODIMENT

Figure 1:
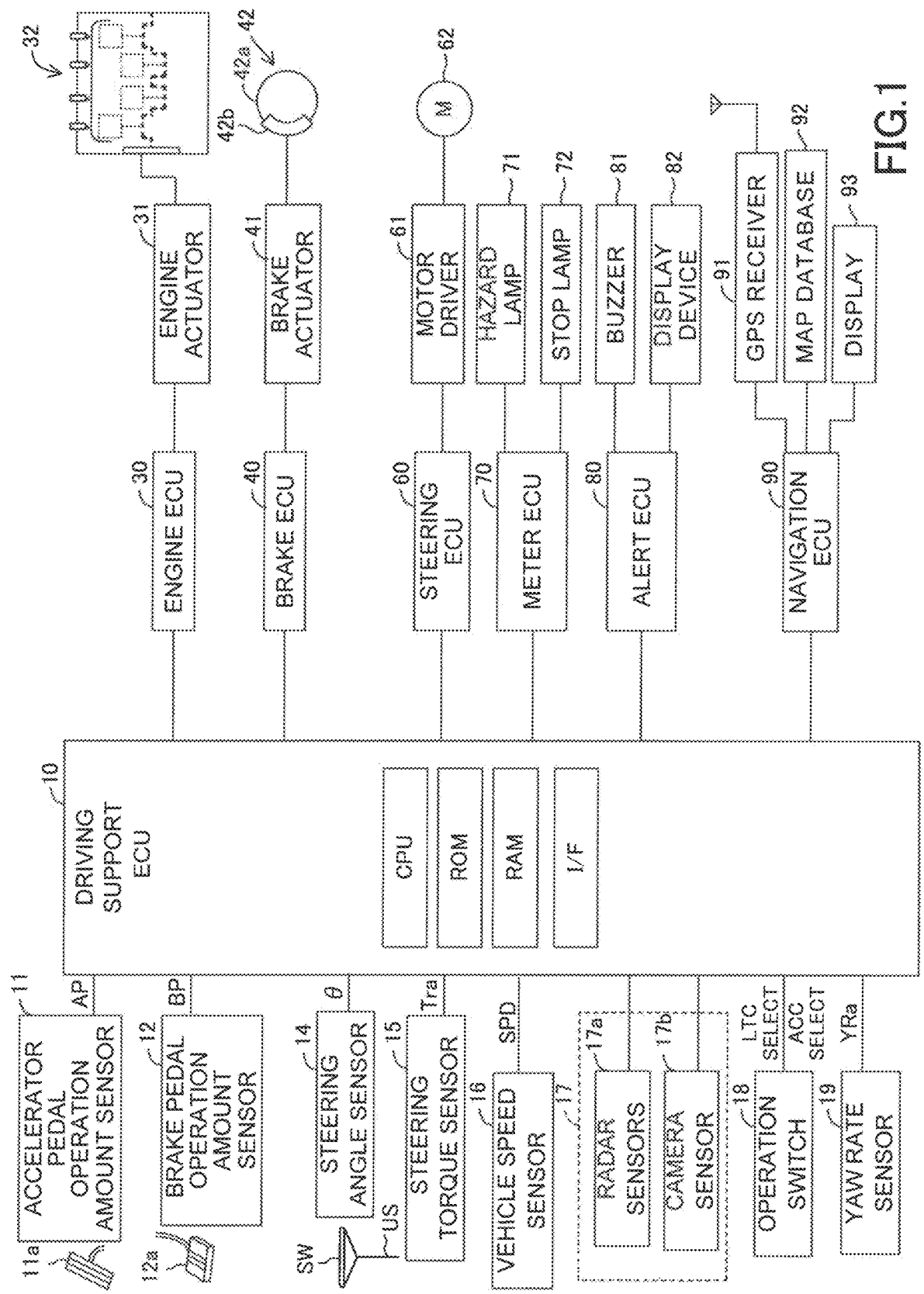
FIG. 1 is a schematic configuration diagram for illustrating a vehicle driving support apparatus according to a first embodiment of the present invention.

A vehicle driving support apparatus according to each of embodiments of the present invention will be described below, referring to drawings. It should be noted that, throughout all of the drawings, the same reference numerals are assigned to the same or corresponding parts.

First Embodiment

A vehicle driving support apparatus (hereinafter, also referred to as a "first embodiment apparatus") according to the first embodiment of the present invention will be described below. The first embodiment apparatus also functions as a vehicle traveling control apparatus.

<Construction>

As shown in FIG. 1, the first embodiment apparatus is applied to a vehicle (an automobile). The vehicle to which the first embodiment apparatus is applied is also referred to as an "own vehicle" to distinguish the vehicle from other vehicles. The first embodiment apparatus includes a driving support ECU 10, an engine ECU 30, a brake ECU 40, a steering ECU 60, a meter ECU 70, an alert ECU 80, and a navigation ECU 90. It should be noted that the driving support ECU 10 is simply referred to (expressed as) a "DSECU", in the following description.

Each of those ECUs is an electronic control unit comprising a microcomputer as a main part. The ECUs are connected with each other via a CAN (Controller Area Network) which is not illustrated so that they are capable of mutually transmitting and receiving information. The microcomputer includes a CPU, a ROM, a RAM, a non-volatile memory, an interface I/F, and the like. The CPU is configured to realize various functions by executing instructions (programs, routines) stored in the ROM. Some or all of these ECUs may be integrated into a single ECU.

The DSECU is connected to sensors (including switches) described below, and is configured to receive a detection signal or an output signal of each of the sensors. It should be noted that each of the sensors may be connected to one of the ECUs other than the DSECU. In this case, the DSECU receives the detection signal or the output signal of the sensor via CAN from the ECU connected to that sensor.

An accelerator pedal operation amount sensor 11 is configured to detect an operation amount (an accelerator opening degree) of an accelerator pedal 11a of the own vehicle to output a signal indicative of the detected operation amount (the accelerator pedal operation amount AP). A brake pedal operation amount sensor 12 is configured to detect an operation amount of a brake pedal 12a to output a signal indicative of the detected operation amount (the brake pedal operation amount BP).

A steering angle sensor 14 is configured to detect a steering angle of the own vehicle to output a signal indicative of the detected steering angle (the steering angle θ). A steering torque sensor 15 is configured to detect a steering torque applied to a steering shaft US of the own vehicle by an operation of the steering wheel SW to output a signal indicative of the detected steering torque (the steering torque Tra). A vehicle speed sensor 16 is configured to detect a traveling speed (a vehicle speed) of the own vehicle to output a signal indicative of the detected vehicle speed (the vehicle speed SPD).

A peripheral monitoring sensor 17 is configured to acquire/obtain at least one of information on a road in front (ahead) of the own vehicle and information on a three-dimensional object present in that road. For example, the three-dimensional objects include moving objects such as pedestrians, bicycles, and automobiles, as well as stationary objects such as utility poles, trees, and guardrails. Hereinafter, these three-dimensional objects may be referred to as "target objects" in some cases. The peripheral monitoring sensor 17 is configured to determine presence or absence of the target object and acquires/calculates information (which will be described) indicative of relative relationships between the own vehicle and the target object. The peripheral monitoring sensor 17 includes radar sensors 17a and a camera sensor 17b.

The radar sensor 17a includes a radar wave transmitting/receiving section and a processing section. The radar wave transmitting/receiving section radiates an electric wave (hereinafter, referred to as a "millimeter wave") in a millimeter waveband to peripheral areas which is a radiation area including at least a front area of the own vehicle. The target object present within the radiation area reflects the millimeter wave. The radar wave transmitting/receiving section receives the millimeter wave (that is, the reflected wave). It should be noted that the radar sensor 17a may be a radar sensor using an electric wave (a radar wave) in a frequency band other than the millimeter waveband.

The processing section of the radar sensor 17a calculates a longitudinal distance in a longitudinal direction between the own vehicle and the target object, a direction of the target object relative to the own vehicle, and a relative speed between the own vehicle and the target object, and the like, based on a phase difference between the transmitted millimeter wave and the received reflected wave, an attenuation level of the reflected wave, and a time (period) from when the millimeter wave is transmitted to when the reflected wave is received. Furthermore, the processing section acquires/obtains, based on those calculated values, target object information of the detected target object (n) which includes a longitudinal distance Dfx(n), a relative speed Vfx(n), a lateral position Dfy(n), a relative lateral speed Vfy(n), and the like, every time a predetermined time elapses. The processing section acquires/obtains these values of the target object information based on predefined x-y coordinates. An x axis is a coordinate axis which extends along the longitudinal direction of the own vehicle so as to pass through a center position in a width direction of a front-end portion of the own vehicle SV. The x axis defines a positive coordinate value for a position in a front direction of the own the vehicle. The y axis is a coordinate axis which is orthogonal to the x axis. The y axis defines a positive coordinate value for a position in a left direction of the own the vehicle. Each of an origin of the x axis and an origin of the y axis is at the center position of the front-end portion of the own vehicle in the width direction. An X coordinate position in the x-y coordinates is referred to as a "longitudinal distance Dfx". A Y coordinate position in the x-y coordinates is referred to as a "lateral position Dfy".

The longitudinal distance Dfx(n) of the target object (n) is a distance (having a sign of plus or minus) in a center axis direction of the own vehicle between the front-end portion of the own vehicle and the rear-end portion of the target object (n) (for example, this target object (n) is a preceding vehicle which is another vehicle (a vehicle other than the own vehicle) which travels in the front area of the own vehicle). The relative speed Vfx(n) of the target object (n) is a difference (=Vs−Vj) between a speed Vs of the target object (n) and the speed Vj (=SPD) of the own vehicle. The speed Vs of the target object (n) is a speed in a traveling direction of the own vehicle. The lateral position Dfy(n) of the target object (n) is a distance (having a sign of plus or minus) of a center position of the target object (n) in a direction (a y axis direction) orthogonal to the central axis of the own vehicle. For example, the center position of the target object (n) is the center position between the left and right front wheels on the axle of the left and right front wheels of the preceding vehicle. The longitudinal distance Dfx(n) of the target object (n) is a distance (having a sign of plus or minus) in the center axis direction of the own vehicle between the front-end portion of the own vehicle and the rear-end portion of the target object (n) (for example, this target object (n) is the preceding vehicle which is the other vehicle which travels in the front area of the own vehicle). The relative lateral speed Vfy(n) of the target object (n) is a speed (having a sign of plus or minus) of the center position of the target object (n) in the direction (the y axis direction) orthogonal to the central axis of the own vehicle.

The camera sensor 17b includes a stereo camera and an image processing part. The stereo camera photographs (takes an image of) views/landscapes of "the left side area and the right side area" in front (ahead) of the own vehicle so as to acquire/obtain a pair of right and left image data (images of the views/landscapes). The image processing part is configured to acquire/obtain presence or absence of the target object and a relative relationship between the own vehicle and the target object, and the like, based on that pair of right and left image data which has been photographed, every time a predetermined time elapses.

It should be noted that the DSECU combines/fuses the relative relationship (the target object information) between the own vehicle and the target object which has been obtained by the radar sensor 17a and the relative relationship (the target object information) between the own vehicle and the target object which has been obtained by the camera sensor 17b, thereby determining a final relative relationship (target object information) between the own vehicle and the target object. In this case, the DSECU analyzes images (image data) transmitted from the camera sensor 17b, thereby determining whether or not the target object detected by the radar sensor 17a is a ghost target object (that is, a target object which has no real objects corresponding to the ghost target object). That is, the DSECU is configured to unrecognize the ghost (the ghost target object) obtained by the radar sensor 17a as a "target object including a vehicle".

Furthermore, the image processing part of the camera sensor 17b recognizes/detects lane markers (hereinafter, also referred simply to as "while lines") such as left and right white lines on a road and the like based on the pair of right and left image data and calculates a shape (for example, a curvature) of an own vehicle traveling lane in which the own vehicle is traveling. In addition, the image processing part calculates a positional relationship (for example, a distance in a lane width direction between "the center position between the left white line and the right white line on the own vehicle traveling lane" and "the center position in the lane width direction of the own vehicle) between the own vehicle traveling lane and the own vehicle" to output those.

It should be noted that the information such as the shape of the own vehicle traveling lane, the positional relationship in the lane width direction and the like may be given from the navigation ECU 90.

An operation switch 18 is a switch operated by a driver of the own vehicle. The driver can operate the operation switch 18 to select whether or not a lane keeping control including the following-travel steering control described later is to be performed. In addition, the driver can operate the operation switch 18 to select whether or not an inter-vehicle-distance control (a following-travel inter-vehicle-distance control) described later is to be performed.

A yaw rate sensor 19 is configured to detect a yaw rate of the own vehicle to output a signal indicative of the detected yaw rate (an actual yaw late YRt).

The engine ECU 30 is connected to an engine actuator 31. The engine actuator 31 is an actuator for changing an operation state of an internal combustion engine 32. The engine actuator 31 includes at least a throttle valve actuator for changing an opening degree of the throttle valve. The engine ECU 30 can change a torque generated by the internal combustion engine 32 through driving the engine actuator 31. As a result, the engine ECU 30 controls a driving force of the own vehicle, to thereby be able to change an acceleration of the own vehicle.

The brake ECU 40 is connected to a brake actuator 41. The brake actuator 41 is provided in a hydraulic pressure circuit provided between a master cylinder (not shown) for pressurizing hydraulic oil using a depression force of the brake pedal 12a and a friction brake mechanism 42 provided in right-and-left front-and-rear wheels. The brake actuator 41 adjusts, in response to an instruction from the brake ECU 40, a hydraulic pressure to be supplied to a wheel cylinder built in the brake caliper 42b of the friction brake mechanism 42 to press a brake pad onto a brake disk 42a using the hydraulic pressure so as to generate a friction braking force. Therefore, the brake ECU 40 controls the brake actuator 41 to control a braking force applied to the own vehicle, to thereby be able to change the acceleration of the own vehicle (in this case, a deceleration).

The steering ECU 60 is a control unit of a well-known electric power steering system and is connected to a motor driver 61. The motor driver 61 is connected to a steering motor 62. The steering motor 62 is incorporated into a "steering mechanism including a steering wheel SW, a steering shaft US, a gear mechanism (not shown) for steering, and the like". The steering motor 62 generates torque using electric power supplied from the motor driver 61, to thereby be able to generate a steering assist torque or steer the left-and-right steered wheels using the generated torque. That is, the steering motor 62 can change a steering angle (also referred to as a "turning angle") of the own vehicle.

The meter ECU 70 is connected to a digital display meter (not shown). Furthermore, the meter ECU 70 is also connected to a hazard lamp 71 and a stop lamp 72 and can change these lighting states in response to instructions transmitted from the DSECU.

The alert ECU 80 is connected to a buzzer 81 and a display device 82. The alert ECU 80 can have the buzzer 81 generate sounds to alert the driver in response to an instruction transmitted from the DSECU. In addition, the alert ECU 80 can cause the display device 82 to light an attention/alert mark such as a warning lamp.

The navigation ECU 90 is connected to a GPS receiver 91 which receives a GPS detection signal for detecting a present position of the own vehicle, a map database 92 which stores a map information and the like, a touch-screen type display 93, and the like. The navigation ECU 90 identifies the present position of the own vehicle based on the GPS detection signal. When the own vehicle is traveling in a road including a plurality of lanes, the navigation ECU 90 can acquire/obtain information for identifying the lane in which the own vehicle is traveling currently. The navigation ECU 90 executes various calculation processes based on the present position of the own vehicle, the map information stored in the map database 92 and the like to perform a route guidance using the display 93 based on that calculation processing result.

The map information stored in the map database 92 includes road information. Furthermore, the road information includes a curvature radius R of a lane (or a curvature of the lane) representing a degree of a curve of the lane.

<Outline of Operation>

Next, the outline of the operation of the first embodiment apparatus will be described. The DSECU of the first embodiment apparatus is configured to be able to perform the inter-vehicle-distance control and the lane keeping control. Firstly, "the inter-vehicle-distance control and the lane keeping control" will be described.

<Inter-Vehicle-Distance Control (ACC: Adaptive Cruise Control)>

The inter-vehicle-distance control (that is, the following-travel inter-vehicle-distance control) is a control for having the own vehicle travel to follow a preceding vehicle which is present in the front area of the own vehicle and which travels immediately in front (ahead) of the own vehicle, while maintaining an inter-vehicle distance (that is, a longitudinal distance of that preceding vehicle with respect to the own vehicle) between the preceding vehicle and the own vehicle at a predetermined target inter-vehicle distance. The following-travel inter-vehicle-distance control itself is well known (for example, refer to Japanese Patent Application Laid-Open No. 2014-148293, No. 2006-315491, Japanese Patent No. 4172434, and Japanese Patent No. 4929777). Therefore, the inter-vehicle-distance control (the following-travel inter-vehicle-distance control) will be described briefly.

The DSECU performs the inter-vehicle-distance control when the inter-vehicle-distance control is requested through the operation of the operation switch 18.

First, when the inter-vehicle-distance control is requested, the DSECU specifies a following target vehicle to be followed based on the target object information of the target object (n) obtained/detected by the peripheral monitoring sensor 17. Hereinafter, the following target vehicle is referred to as an "inter-vehicle-distance target vehicle" or an "ACC target vehicle". More specifically, as will be described below, the DSECU specifies/determines the inter-vehicle-distance target vehicle from among one or more of other vehicles (that is, one or more of the preceding vehicles) traveling in the front area of the own vehicle.

Step 1: the DSECU acquires/obtains "the vehicle speed SPD of the own vehicle" from the vehicle speed sensor 16 and acquires/obtains "the yaw rate Yrt of the own vehicle" from the yaw rate sensor 19.

Step 2: the DSECU predicts/extrapolates a traveling course in which the own vehicle will travel in the x-y coordinates, based on the vehicle speed SPD and the yaw rate Yrt.

Step 3: the DSECU specifies/extracts the other vehicle having an absolute value of the distance in a lane width direction with respect to the extrapolated traveling course of the own vehicle being equal to or smaller than a predetermined reference threshold, as an inter-vehicle-distance target vehicle (a). The DSECU specifies/extracts this other vehicle from among the one or more of the other vehicles (that is, the one or more of the preceding vehicles which are present in the front area of the own vehicle) having a longitudinal distance Dfx(n) being a positive value. The reference threshold is set so as to decrease as the longitudinal distance increases. It should be noted that the DSECU specified/determines the other vehicle having a minimum value of the longitudinal distance Dfx(n) as the inter-vehicle-distance target vehicle (a), if there are a plurality of the other vehicles which have been specified.

When the inter-vehicle-distance target vehicle (a) is specified, the DSECU calculates a target acceleration Gtgt in accordance with any one of the following Expression (1) and Expression (2). In Expression (1) and Expression (2), Vfx(a) is a relative speed of the inter-vehicle-distance target vehicle (a) with respect to the own vehicle, each of k1 and k2 is a predetermined positive gain (coefficient), and $\Delta D1$ is an inter-vehicle deviation ($\Delta D1 = Dfx(a) - Dtgt$) obtained by subtracting a "target inter-vehicle-distance Dtgt" from "the longitudinal distance Dfx(a) of the inter-vehicle-distance target vehicle (a)". The target inter-vehicle-distance Dtgt is calculated by multiplying a target inter-vehicle time Ttgt by the vehicle speed SPD of the own vehicle (that is, Dtgt=Ttgt×SPD). The target inter-vehicle-distance Dtgt is set by the driver using the operation switch 18.

The DSECU determines the target acceleration Gtgt in accordance with the following Expression (1) when the value (k1×ΔD1+k2×Vfx(a)) is positive or zero. ka1 is a positive gain (coefficient) for accelerating the own vehicle and is set to a value equal to or smaller than "1". The DSECU determines the target acceleration Gtgt in accordance with the following Expression (2) when the value (k1×ΔD1+k2×Vfx(a)) is negative. kd1 is a positive gain (coefficient) for decelerating the own vehicle. In this example, kd1 is set to "1".

$$Gtgt \text{ (for acceleration)} = ka1 \cdot (k1 \cdot \Delta D1 + k2 \cdot Vfx(a)) \quad (1)$$

$$Gtgt \text{ (for deceleration)} = kd1 \cdot (k1 * \Delta D1 + k2 \cdot Vfx(a)) \quad (2)$$

It should be noted that when the inter-vehicle-distance target vehicle is unable to be specified/determined due to absence of the preceding vehicle, the DSECU determines the target acceleration Gtgt based on a "target vehicle speed set by using the operation switch 18" and the "vehicle speed SPD" in such a manner that the vehicle speed SPD of the own vehicle becomes equal to the target vehicle speed.

The DSECU controls the engine actuators 31 by using the engine ECU 30, and if necessary, controls the brake actuator 41 by using the brake ECU 40 such that an acceleration of the own vehicle becomes equal to the the target acceleration Gtgt.

<Lane Keeping Control>

The DSECU performs the lane keeping control only while the inter-vehicle-distance control is being performed. The DSECU performs the lane keeping control when the lane keeping control is requested through the operation of the operation switch 18. In other words, the DSECU does not perform the lane keeping control even when the lane keeping control is requested to be performed through the operation of the operation switch 18, if the inter-vehicle-distance control is not being performed.

When at least any one of the left white line and the right white line is recognized by the camera sensor 17b over a predetermined distance in a forward direction of the own vehicle SV, the DSECU sets/determines a target traveling line Ld based on at least any one of the left white line and the right white line which is recognized.

More specifically, when both of the left white line and the right white line are recognized over the predetermined distance in the forward direction of the own vehicle SV, the DSECU sets/determines a line (a center line) passing through midpoints in a lane width direction between the left white line and the right white line, as the target traveling line Ld.

In contrast, when only one of the left white line and the right white line is recognized over the predetermined distance in the forward direction of the own vehicle SV, the DSECU extrapolates/determines a position of the unrecognized white line (the other white line) based on the one recognized white line and a lane width which was obtained at a time point at which both of the left white line and the right white line were recognized. Then, the DSECU sets/determines the center line passing the midpoints between the one white line recognized and the other white line which is extrapolated, as the target traveling line Ld.

The DSECU applies the steering torque to the steering mechanism by using the steering motor 62 to change the steering angle of the own vehicle in such a manner that the lateral position of the own vehicle (i.e., the position of the own vehicle with respect to the own vehicle traveling lane) is maintained in the vicinity of the target traveling line Ld, to thereby support a steering operation of the driver (for example, refer to Japanese Patent Application Laid-Open No. 2008-195402, No. 2009-190464, No. 2010-6279, and Japanese Patent No. 4349210).

In addition, when there is no white line recognized over the predetermined distance in the forward direction of the own vehicle SV, the DSECU specifies/determines the other vehicle which is to be the following-travel steering target vehicle from among one or more of the other vehicles traveling in the front area of the own vehicle by using the same method as the above-described method for specifying/determining the inter-vehicle-distance target vehicle. Thereafter, the DSECU generates/produces a traveling trajectory of the following-travel steering target vehicle. Hereinafter, the traveling trajectory is also referred to as a "preceding vehicle trajectory". The DSECU applies the steering torque to the steering mechanism to change the steering angle in such a manner that the own vehicle travels along (in accordance with) a target traveling line determined/set based on that preceding vehicle trajectory, so as to support the operation of the steering by the driver. In this example, the DSECU determines/adopts the preceding vehicle trajectory itself as the target traveling line Ld. It should be noted that the DSECU may set a "line shifted in the lane width direction from the preceding vehicle trajectory by a predetermined distance" as the target traveling line Ld.

It should be noted that the lane keeping control which performs the steering control of the own vehicle using the traveling trajectory (the preceding vehicle trajectory) of the following-travel steering target vehicle in the above manner is also referred to as a "following-travel steering control" or a "TJA (Traffic Jam Assist)". Furthermore, "the above steering control (including the TJA) which keeps the lateral position of the own vehicle in a vicinity of the target traveling line Ld" is collectively referred to as an "LTC or Lane Trace Control" in some cases.

Figure 2:
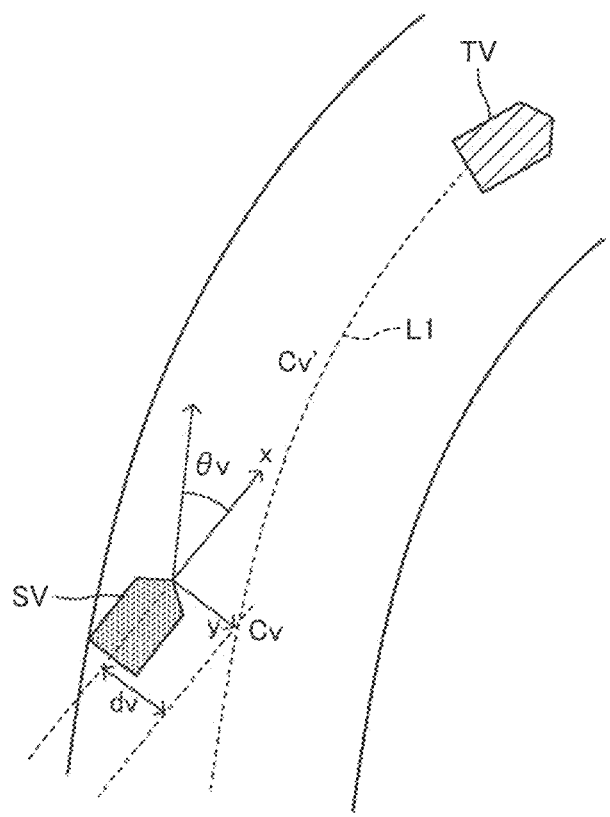
FIG. 2 is a plan view for illustrating a lane keeping control.

Hereinafter, the following-travel steering control (TJA) will be described in more detail. As shown in FIG. 2, the DSECU specifies/determines the preceding vehicle TV (for convenience, referred to as a "second vehicle" in some cases) as the following-travel steering target vehicle. The DSECU generates the traveling trajectory of the second vehicle based on the "target object information of the following-travel steering target vehicle TV" obtained every time a predetermined time elapses.

Figures 3A, 3B, 3C:
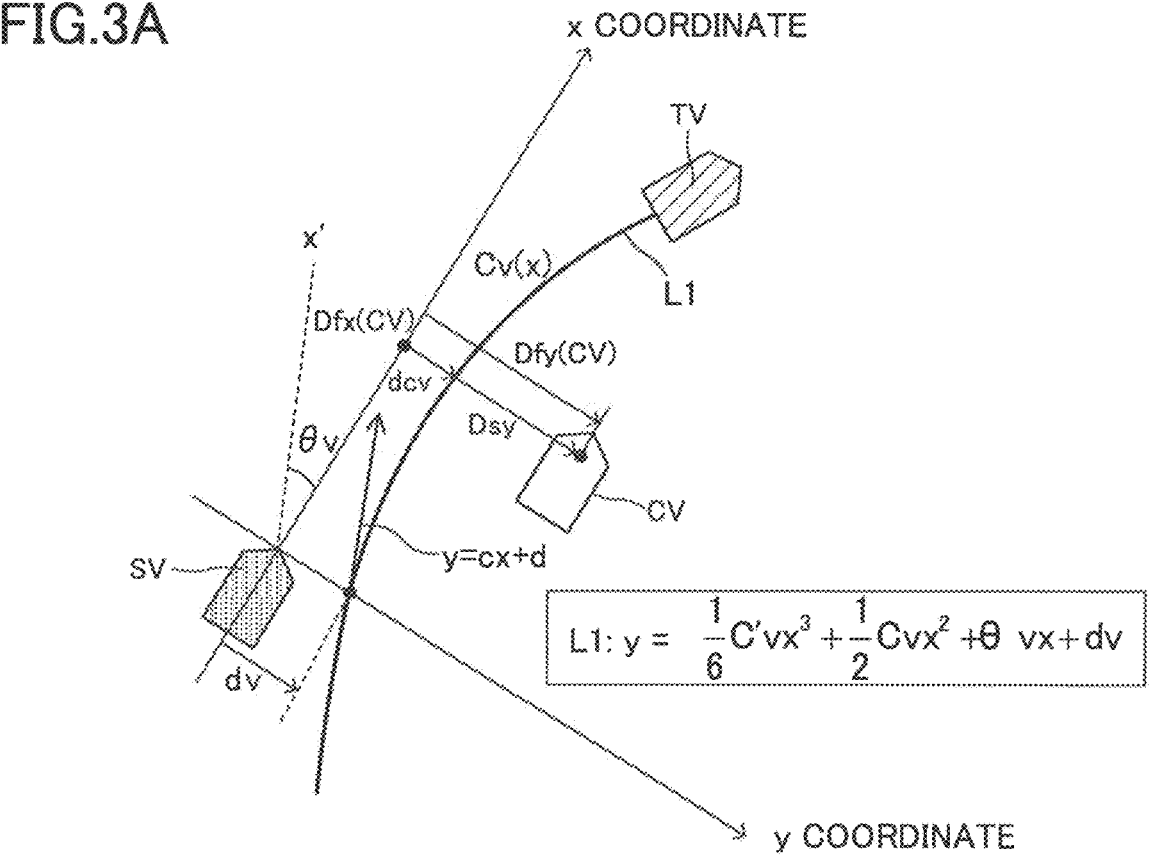

As shown in FIG. 3A, it is known that this traveling trajectory is approximated accurately by a curve line represented by a cubic function of the following Expression (3) in the above-described x-y coordinates having "the center position of the front-end portion of the own vehicle SV at a present position of the own vehicle at a present time point" as the origin.

$$y = (1/6)Cv' \cdot x^3 + (1/2)Cv \cdot x^2 + \theta v \cdot x + dv \quad (3)$$

Cv': Cv' is a curvature change rate (curvature change amount per unit distance (Δx) at an arbitrary position (x=x0, x0 is an arbitrary value) on the curve) of a curvature of the traveling trajectory of the following-travel steering target vehicle TV.

Cv: Cv is the curvature of the traveling trajectory of the following-travel steering target vehicle TV when the following-travel steering target vehicle TV was present at the present position (x=0) of the own vehicle SV (that is, when the following-travel steering target vehicle TV was present at the position of (x=0, y=dv)).

θv: θv is an angle deviation (yaw angle) between a "direction of the traveling trajectory when the following-travel steering target vehicle TV was present at the present position (x=0) of the own vehicle SV" and the "traveling direction ("+" direction of the x-axis) of the own vehicle SV".

dv: dv is a distance dv (referred to as a "center distance") in the lane width direction between the present position (x=0, y=0) of the own vehicle SV and the traveling trajectory.

The above-described Expression (3) is derived as follows. That is, as shown in FIG. 3B, the traveling trajectory is defined by (or expressed as) the cubic function $f(x)=ax^3+bx^2+cx+d$. Using expressions and conditions shown in FIG. 3B, the relationships shown in FIG. 3C (that is, "the relationship between the coefficients (a, b, c and d) of the cubic function f(x), the curvature, and the like") are derived. Therefore, the DSECU calculates the coefficients (a, b, c, and d) of the cubic function f(x) based on the relationship shown in FIG. 3C, to thereby derive the above-described Expression (3).

The coefficients (that is, the coefficients a and b of the function f(x)) of the first term and the second term on the right side of Expression (3) are able to be calculated/obtained by inputting time-series data consisting of values described below (these values are also referred to as "preceding vehicle trajectory basic information") into a Karman filter (not shown).

The preceding vehicle trajectory basic information is as follows:

a longitudinal distance Dfx (Dfx=Dfx(VT)(t)) of the inter-vehicle-distance target vehicle TV at a time t, a lateral distance Dfy (Dfy=Dfy(VT)(t)) of the inter-vehicle-distance target vehicle TV at the time t, a yaw rate YRt(t) of the own vehicle SV at the time t, and a vehicle speed Vsx (=SPD(t)) of the own vehicle SV at the time t.

It should be noted that "t" is a time (time point). The coefficient (that is, the coefficient c of the function f(x)) of the third term on the right side of Expression (3) is the yaw angle θv. The coefficient (that is, the coefficient d of the function f(x)) of the fourth term on the right side of Expression (3) is the center distance dv.

The DSECU sets/adopts the generated traveling trajectory as the target traveling line Ld. In this case, the DSECU can obtain "target lane information necessary for the lane keeping control" which is shown in FIG. 2, based on the coefficients of the cubic function of Expression (3). As described later, this target lane information includes the curvature Cv of the traveling trajectory, the yaw angle θv with respect to the traveling trajectory, the center distance dv with respect to the traveling trajectory, and the like.

More specifically, the DSECU acquires/obtains information (generation necessary information) necessary for generating the traveling trajectory. The information necessary for generating the traveling trajectory includes coordinate values of the following-travel steering target vehicle in the x-y coordinates, the vehicle speed SPD of the own vehicle SV, the yaw rate YRt of the own vehicle SV, and the like. The DSECU acquires/obtains the coordinate values of the following-travel steering target vehicle in the x-y coordinates based on the target object information on the following-travel steering target vehicle. The DSECU acquires/obtains the vehicle speed SPD from the vehicle speed sensor 16 and acquires/obtains the yaw rate YRt of the own vehicle SV from the yaw rate sensor 19.

The DSECU inputs the acquired generation necessary information into the Karman filter to generate/produce the traveling trajectory represented by Expression (3). The coefficients of Expression (3) are determined, therefore the DSECU acquires/obtains, based on those coefficients, "the curvature Cv of the traveling trajectory, the curvature change rate Cv' of the traveling trajectory, the yaw angle θv of the own vehicle SV with respect to the traveling trajectory, and "the center distance dv between the traveling trajectory and the present position of the own vehicle SV" "at the present position of the own vehicle SV.

The DSECU calculates a target yaw rate YRC* by using the following Expression (4) based on the center distance dv, the yaw angle θv, and the curvature Cv, every time a predetermined time elapses. It should be noted that the DSECU similarly calculates the center distance dv, the yaw angle θv, and the curvature Cv based on the target traveling line Ld and the information obtained from the camera sensor 17b when the target traveling line Ld is set/determined based on at least any one of the left white line and the right white line, as described above.

$$YRc^* = K1 \times dv + K2 \times \theta v + K3 \times Cv \quad (4)$$

The DSECU calculates a target steering torque Tr* for realizing/achieving the target yaw rate YRc based on the target yaw rate YRc and the actual yaw rate YRt, every time a predetermined time elapses. More specifically, the DSECU stores a lookup table which defines the relationship among "the deviation between the target yaw rate YRc* and the actual yaw rate YRt", the vehicle speed, and the target steering torque Tr*, in advance. The DSECU calculates the target steering torque Tr* by applying "the deviation between the target yaw rate YRc* and the actual yaw rate YRt" and "the actual vehicle speed SPD" to the stored lookup table.

The DSECU controls the steering motor 62 by using the steering ECU 60 in such a manner that the actual steering torque Tra becomes equal to the target steering torque Tr*. In this manner, the DSECU performs the lane keeping control for controlling the steering angle (the steering angle θ) of the own vehicle SV so as to cause the own vehicle SV to travel along the target traveling line Ld.

It should be noted that the DSECU may perform the lane keeping control as described below. That is, the DSECU sets a target value of the center distance dv to "0" and sets a target value of the yaw angle θv to "0". The DSECU calculates the target steering angle θ* by applying "a deviation (that is, an actual center distance dv) between the actual center distance dv and the target value (=0), a deviation (that is, an actual yaw angle θv) between the yaw angle θv and the target value (=0), and the curvature Cv" to the following Expression (5). Furthermore, the DSECU controls the steering motor 62 by using the steering ECU 60 in such a manner that the actual steering angle θ becomes equal to the target steering angle θ*. In Expression (5), each of Klta1, Klta2, and Klta3 is a control gain.

$$\theta^* = Klta1 \cdot Cv + Klta2 \cdot \theta v + Klta3 dv \quad (5)$$

When both of the following conditions are satisfied, the DSECU cancels performing of the lane keeping control.

A condition satisfied when the DSECU is unable to set the target traveling line Ld based on at least any one of the left white line and the right white line.

A condition satisfied when the DSECU is unable to generate the preceding vehicle trajectory or when the DSECU is able to determine that the following-travel steering target vehicle is outside of a detectable area of the radar sensor 17a.

That is, in this case, the DSECU does not perform the lane keeping control. The above-mentioned description is the outline of the lane keeping control.

<Specifying (Setting) the Following-Travel Steering Target Vehicle and the Inter-Vehicle-Distance Target Vehicle at a Time Point at which the Cutting-in Vehicle is Present>

Figure 4:
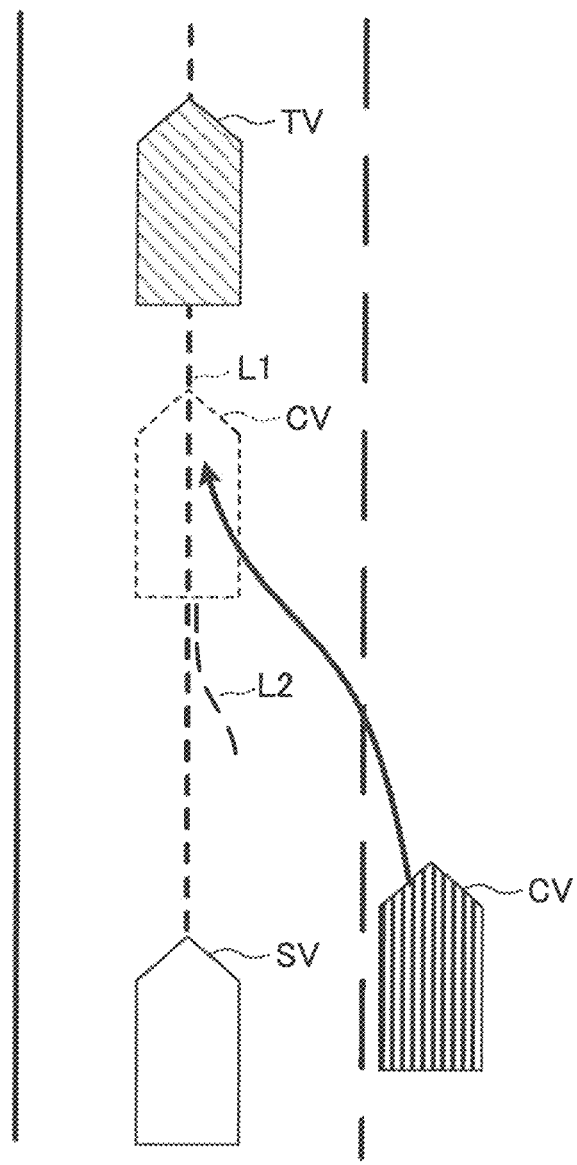
FIG. 4 is a plan view for illustrating the lane keeping control.

Next, referring an example shown in FIG. 4, a method for specifying "the following-travel steering target vehicle and the inter-vehicle-distance target vehicle at the time point at which the cutting-in vehicle is present" will be described. "The following-travel steering target vehicle and the inter-vehicle-distance target vehicle" may be collectively referred to as a "target vehicle" in some cases.

In this example, the DSECU has been specified a first other vehicle TV which is traveling in front (ahead) of the own vehicle SV as both of "the following-travel steering target vehicle and the inter-vehicle-distance target vehicle" at the present time point Therefore, the DSECU performs the inter-vehicle-distance control for maintaining an inter-vehicle distance between the own vehicle SV and the first other vehicle TV at the target inter-vehicle distance and performs the following-travel steering control using the traveling trajectory L1 of the first other vehicle TV as the target traveling line.

In this situation, a case occurs where a second other vehicle CV other than the first other vehicle TV cuts in between the own vehicle SV and the first other vehicle TV. In this case, the DSECU needs to change the following-travel steering target vehicles and the inter-vehicle-distance target vehicles from the first other vehicle TV to the second other vehicle CV (that is, the cutting-in vehicle CV).

In this case, if a timing at which the DSECU specifies the cutting-in vehicle CV as the target vehicle (which functions as both of the following-travel steering target vehicle and the inter-vehicle-distance target vehicle) is too early, a situation is highly likely to occur where the own vehicle SV is unable to travel stably in the vicinity of the center line of the own vehicle traveling lane, for the following reasons.

That is, as compared with the cutting-in vehicle CV, the first other vehicle TV is highly likely to travel along the own vehicle traveling lane of the own vehicle SV, therefore, the traveling trajectory L1 of the first other vehicle TV is highly likely to be present in the vicinity of the center line of the own vehicle traveling lane. Therefore, if the timing at which the DSECU specifies the cutting-in vehicle CV as the target vehicle is too early, a period is shortened for which the own vehicle SV can travel along "the traveling trajectory L1 having a high possibility that a deviation with respect to the center line of the own vehicle traveling lane is small". As a result, the own vehicle SV is highly likely to be greatly apart (or greatly deviate) from the center line of the own traveling lane.

Meanwhile, a traveling behavior of the cutting-in vehicle CV includes a behavior owing to a lane change (that is, the traveling behavior in the lane width direction). Therefore, as compared with the traveling trajectory L1 of the first other vehicle TV, the traveling trajectory L2 of the cutting-in vehicle CV is highly unlikely to be along the center line of the own vehicle traveling lane of the own vehicle SV. For this reason, if the timing at which the DSECU specifies the cutting-in vehicle CV as the target vehicle is too early, the traveling behavior of the cutting-in vehicle CV in the lane width direction is reflected in (affects) the target traveling line (that is, a shape of the target traveling line). As a result, the own vehicle SV has a high possibility of being unable to travel along the own vehicle traveling lane stably.

In contrast, if the timing at which the DSECU specifies the cutting-in vehicle CV as the target vehicle is too late, in a period for which the own vehicle SV travels along the traveling trajectory L1 of the first other vehicle TV serving as the target vehicle, a part of a body of the cutting-in vehicle CV enters between the own vehicle SV and the first other vehicle TV. As a result, a situation occurs where the first other vehicle TV is hidden by the cutting-in vehicle CV. Therefore, accuracy of the target object information on the first other vehicle TV which is acquired by the peripheral monitoring sensor 17 may degrade/decrease. As a result, the accuracy of the traveling trajectory of the first other vehicle TV may degrade/decrease (the shape of the traveling trajectory may become inappropriate) so that the own vehicle SV may have a high possibility of traveling unstably.

In addition, if the timing at which the DSECU specifies the cutting-in vehicle CV as the target vehicle is too late, for example, when the cutting-in vehicle cuts in ahead of the own vehicle SV while decelerating greatly, the inter-vehicle-distance between that cutting-in vehicle and the own vehicle becomes excessively shortened. For this reason, there is a possibility of giving a sense of uneasiness to the driver of the own vehicle SV. Furthermore, immediately after the cutting-in vehicle CV is specified as the target vehicle, there is a possibility of giving an uncomfortable feeling to the driver due to a sudden deceleration of the own vehicle as a result of performing the inter-vehicle-distance control.

In view of the above, the DSECU newly specifies the cutting-in vehicle CV as the inter-vehicle-distance vehicle at a first time point in a period (hereinafter, also referred to as a "cutting-in period") from a time point when the cutting-in vehicle CV starts cutting in ahead of the own vehicle SV to a time point when the cutting-in vehicle CV finishes/completes the cutting-in. In addition, the DSECU newly specifies the cutting-in vehicle as the following-travel steering target vehicle at "a second time point which is after the first time point" in the cutting-in period. That is, the timing at which the DSECU sets/determines the cutting-in vehicle CV as the inter-vehicle-distance target vehicle is advanced as compared with (or is made earlier than) the timing at which the DSECU sets/determines the cutting-in vehicle CV as the following-travel steering target vehicle. It should be noted that the cutting-in period may also be expressed as a "period from a time point when the cutting-in vehicle CV starts moving in the lane width direction toward the own vehicle traveling lane to a time point when the cutting-in vehicle CV finishes moving in the lane width direction".

More specifically, it is assumed that the cutting-in vehicle CV is about to (starts to) cut in between the own vehicle SV and the first other vehicle TV when the DSECU has been specifying the first other vehicle TV as the target vehicle (the steering target following and the inter-vehicle-distance target vehicle) and is performing "the inter-vehicle-distance control and the following-travel steering control" with respect to the first other vehicle TV. In this case, the DSECU determines whether or not a position of the cutting-in vehicle CV in the lane/road width direction is (sufficiently) close to the preceding vehicle trajectory which is "the traveling trajectory of the first other vehicle TV (that is, the target vehicle at the present time point)".

For making this determination, the DSECU calculates a "distance Dsy of the cutting-vehicle CV in the lane/road width direction with respect to the traveling trajectory (preceding vehicle trajectory) of the first other vehicle TV" shown in FIG. 3 using the following Expression (6). In the Expression (6), Dfy(CV) is a "lateral position of the cutting-in vehicle CV" obtained by the peripheral monitoring sensor 17. dcV is a "lateral position of the first other vehicle TV" when the longitudinal distance Dfx(TV) of the first other vehicle TV is equal to a "longitudinal distance Dfx(CV) of the cutting-in vehicle CV" That is, dcV is a value obtained by substituting the "longitudinal distance Dfx(CV)" for the "variable x in the above Expression (3)". The distance Dsy is also referred to as a "determination distance (or a distance for determination) Dsy".

$$Dsy=|Dfy(CV)-dcv| \quad (6)$$

The DSECU determines whether or not the determination distance Dsy is equal to or smaller than a predetermined inter-vehicle-distance control threshold Daccth. When it is determined that the determination distance Day is equal to or smaller than the predetermined inter-vehicle-distance control threshold Daccth, the DSECU newly specifies the cutting-in vehicle CV as the inter-vehicle-distance target vehicle. This time point is the above-described first time point. When the determination distance Dsy changes from a value greater than the inter-vehicle-distance control threshold Daccth to a value equal to or smaller than the inter-vehicle-distance control threshold Daccth, the cutting-in vehicle CV is in the middle of the cutting-in (under a movement for the cutting-in). Therefore, the first time point is a time point in the cutting-in period from when a potential cutting-in vehicle starts cutting in to when the potential cutting-in vehicle finishes cutting in. The DSECU performs the inter-vehicle-distance control with the cutting-in vehicle CV set/determined/adopted as the inter-vehicle-distance target vehicle after the first time point. It should be noted that the DSECU continues performing the following-travel steering control with respect to the first other vehicle TV which has been set/determined/adopted as the following-travel steering target vehicle until the second time point arrives (even after the first time point).

The inter-vehicle-distance control threshold Daccth is a positive value. The inter-vehicle-distance control threshold Daccth is set to a value which can prevent the own vehicle SV from approaching the cutting-in vehicle CV excessively, if the DSECU specifies the cutting-in vehicle CV as a new inter-vehicle-distance target vehicle at a time point at which the determination distance Dsy becomes equal to or smaller than the inter-vehicle-distance control threshold Daccth, even when the cutting-in vehicle decelerates greatly. In other words, the value for the inter-vehicle-distance control threshold Daccth is a value determined in such a manner that the own vehicle SV does not need to greatly decelerate immediately after the cutting-in vehicle CV is specified as the inter-vehicle-distance target vehicle.

Furthermore, the DSECU determines whether or not the determination distance Dsy is equal to or smaller than a "predetermined following-travel steering control threshold Dtjath which is smaller than the inter-vehicle-distance control threshold Daccth". When determining that the determination distance Dsy is equal to or smaller than the predetermined following-travel steering control threshold Dtjath, the DSECU newly specifies the cutting-in vehicle CV as the following-travel steering target vehicle. This time point is the above-described second time point. When the determination distance Dsy changes from a value greater than the following-travel steering control threshold Dtjath to a value equal to or smaller than the following-travel steering control threshold Dtjath, the cutting-in vehicle CV is still in the middle of the cutting-in (under the movement for the cutting-in). Therefore, similarly to the first time point, the second time point is a time point in the cutting-in period from when the potential cutting-in vehicle starts cutting in to when the potential cutting-in vehicle finishes cutting in. After the second time point, the DSECU performs the following-travel steering control with respect to the cutting-in vehicle set as the following-travel steering target vehicle and performs the inter-vehicle-distance control with respect to the cutting-in vehicle CV set as the inter-vehicle-distance target vehicle.

The following-travel steering control threshold Dtjath is a positive value and a value smaller than the inter-vehicle-distance control threshold Daccth. The following-travel steering control threshold Dtjath is set at a value that allows the DSECU to accurately generate the traveling trajectory (i.e., the target traveling line LD) of the following-travel steering target vehicle TV until the DSECU newly specifies the following-travel steering target vehicle, if the DSECU specifies the cutting-in vehicle CV as the new following-travel steering target vehicle at a time point at which the determination distance Dsy becomes equal to or smaller than the following-travel steering control threshold Dtjath. In addition, the following-travel steering control threshold Dtjath is set at a value obtained when the cutting-vehicle CV is about to finish/complete (the movement of) the cutting-in to a certain degree that the behavior of the cutting-in vehicle CV in the lane/road width direction is no longer greatly reflected in (or no longer greatly affects) the traveling target line Ld.

As can be seen from the above description, in the period from the first time point to the second time point, the vehicle specified as the inter-vehicle-distance target vehicle and the vehicle specified as the following-travel steering target vehicle are different from each other.

<Specific Operation>

Next, specific operations of the CPU (hereinafter, simply referred to as the "CPU" in some cases) of the DSECU will be described. The CPU is configured to execute a routine (TJA routine) shown by a flowchart in FIG. 5, every time a predetermined time elapses. It should be noted that the CPU is configured to perform the inter-vehicle-distance control (the following-travel inter-vehicle-distance control or the ACC control) according to a routine shown in FIG. 6 described later. The CPU executes the routine shown in FIG. 5 only when the inter-vehicle-distance control is being performed through a process of step 620 shown in FIG. 6 described later.

Figure 5:
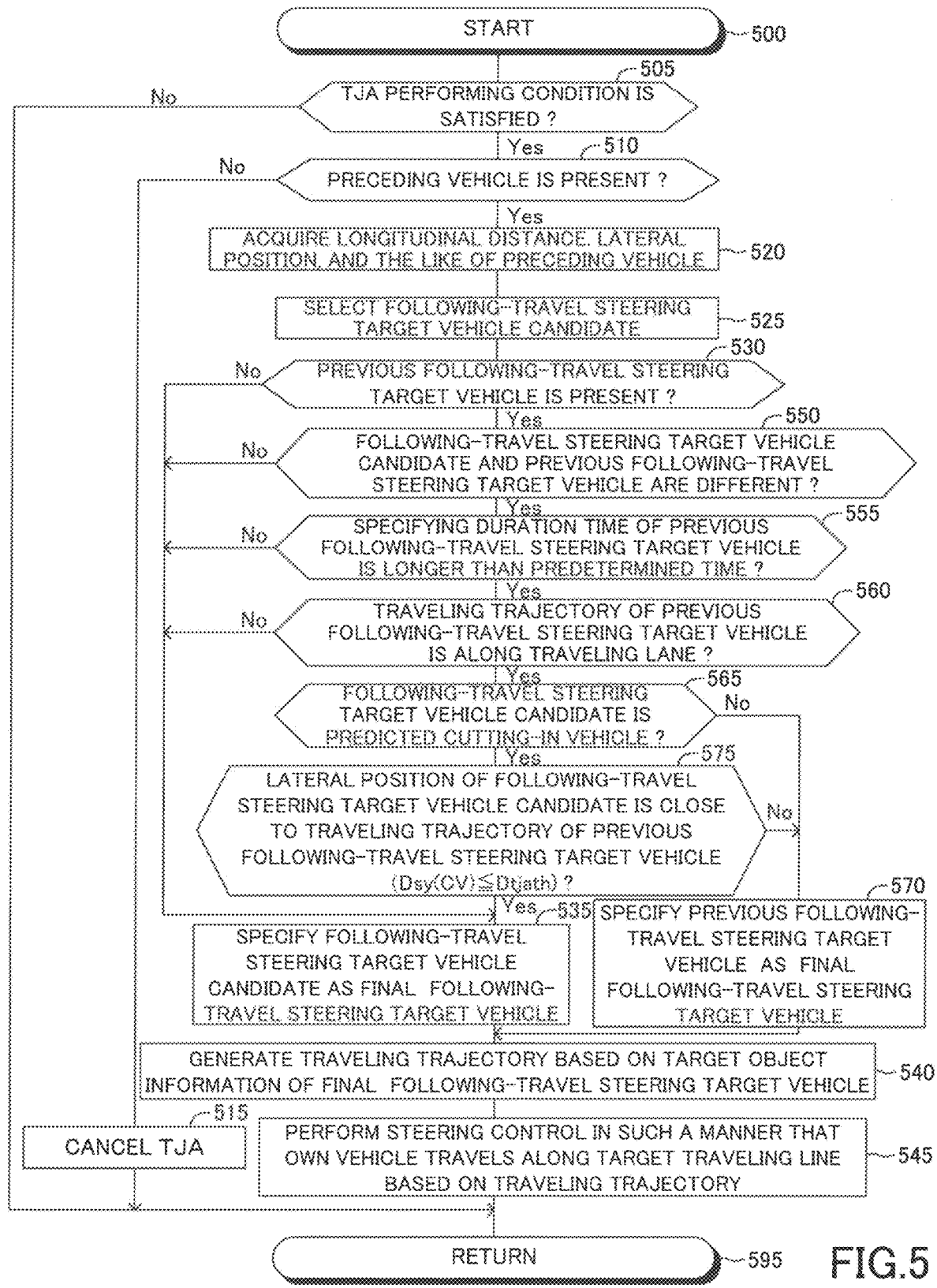
FIG. 5 is a flowchart showing a routine executed by a CPU of a driving support ECU provided on a vehicle driving support apparatus according to a first embodiment shown in FIG. 1.

Therefore, when a predetermined time arrives while the inter-vehicle-distance control is being performed, the CPU starts processing from step 500 shown in the routine of FIG. 5 and proceeds to step 505 to determine whether or not a performing condition of the following-travel steering control (TJA) which is one type of the lane keeping controls is satisfied. Hereinafter, the performing condition of the following-travel steering control (TJA) is referred to as a "TJA performing condition"

The TJA performing condition is satisfied when all of the following conditions (conditions 1 to 3) are satisfied, for example.

The condition 1 is a condition satisfied when performing the lane keeping control is being selected through the operation of the operation switch 18.

The condition 2 is a condition satisfied when the vehicle speed SPD is equal to or greater/higher than a predetermined lower limit vehicle speed and is equal to or smaller/lower than a predetermined upper limit vehicle speed.

The condition 3 is a condition satisfied when the DSECU is unable to set the traveling target line Ld based on "at least any one of the left white line and the right white line".

When the TJA performing condition is not satisfied, the CPU makes a "No" determination at step 505 and proceeds to step 595 to tentatively terminate the present routine.

In contrast, when the TJA performing condition is satisfied, the CPU makes a "Yes" determination at step 505 and proceeds to step 510 to determine whether or not the one or more of the other vehicles is/are present within a predetermined area (for example, within the detectable area of the radar sensor 17a) in front (ahead) of the own vehicle SV based on the target object information. It should be noted that the other vehicle present within the predetermined area in front of the own vehicle SV is also referred to as the "preceding vehicle", as described above.

When the other vehicle is not present within the predetermined area in front of the own vehicle SV (that is, when the preceding vehicle is not present), the CPU makes a "No" determination at step 510 and proceeds to step 515 to cancel the TJA. That is, the CPU stops the lane keeping control including the following-travel steering control. Thereafter, the CPU proceeds to step 595 to tentatively terminate the present routine. It should be noted that the state where the preceding vehicle is not present can be said to be one of cancellation conditions of the TJA.

In contrast, when the one or more of the other vehicles is/are present within the predetermined area in front of the own vehicle SV (that is, when the one or more of the preceding vehicles is/are present), the CPU makes a "Yes" determination at step 510 and proceeds to step 520 to acquire/obtain the longitudinal distance Dfx, the lateral position Dfy, and the like of the preceding vehicle(s).

Thereafter, the CPU proceeds to step 525 to select a candidate of the following-travel steering target vehicle whose traveling trajectory should be set to (used for) the target traveling line from the one or more of the preceding vehicle(s). Hereinafter, this candidate is referred to as a "following-travel steering target vehicle candidate". More specifically, the CPU acquires/obtains the vehicle speed SPD of the own vehicle SV from the vehicle speed sensor 16 and acquires/obtains the yaw rate YRt of the own vehicle SV from the yaw rate sensor 19. The CPU predicts/extrapolates the traveling course of the own vehicle SV based on the acquired/obtained speed SPD and the acquired/obtained yaw rate YRt. Next, the CPU selects a preceding vehicle (n1) which is the closest to "the extrapolated traveling course of the own vehicle SV" in the lane width direction as the "following-travel steering target vehicle candidate", based on the longitudinal distance Dfx and the lateral position Dfy of each of the preceding vehicle(s).

Thereafter, the CPU proceeds to step 530 to determine whether or not a preceding vehicle (n2) which has been specified as the following-travel steering target vehicle in the previous calculation (i.e., when this routine was executed the predetermined time before the present time point) is present at the present time point. Hereinafter, the preceding vehicle (n2) is referred to as a "previous following-travel steering target vehicle". It should be noted that the DSECU is configured to identify/determine whether or not certain target object information is target object information on the same target object (that is, the same preceding vehicle) based on the target object information sent/transmitted from the peripheral monitoring sensor 17 every time a predetermined time elapses.

Now, it is assumed that the performing condition of the following-travel steering control (TJA) was not satisfied in the previous calculation and the performing condition of the following-travel steering control (TJA) becomes satisfied at the present calculation (that is, at the present time point). In this case, since the previous following-travel steering target vehicle is not present, the CPU makes a "No" determination at step 530 and proceeds to step 535 to specify the "following-travel steering target vehicle candidate (that is, the preceding vehicle (n1))" selected at step 525 as a final "following-travel steering target vehicle".

Next, the CPU proceeds to step 540 to generate the traveling trajectory based on the target object information of the final following-travel steering target vehicle. Thereafter, the CPU proceeds to step 545 to set the traveling trajectory which has been generated at step 540 as the target traveling line and to control the steering angle of the own vehicle SV so as to cause the own vehicle SV to travel along that target traveling line. That is, the CPU performs the following-travel steering control. Thereafter, the CPU proceeds to step 595 to tentatively terminate the present routine.

In contrast, when the preceding vehicle which was the following-travel steering target vehicle in the previous calculation is also present at the present time point, the CPU makes a "Yes" determination at step 530. This preceding vehicle is the final following-travel steering target vehicle which was specified at step 535 in the previous calculation and is the preceding vehicle recognized as the previous following-travel steering target vehicle in the present calculation. Thereafter, the CPU proceeds to step 550 to determine whether or not the "following-travel steering target vehicle candidate" which has been selected at step 525 is a vehicle which is different from a vehicle specified as the "previous following-travel steering target vehicle" are different from each other.

For example, when a preceding vehicle (a) has been specified as the "final following-travel steering target vehicle" in the previous calculation, the own vehicle travels along the traveling trajectory (the preceding vehicle trajectory) of the preceding vehicle (a). Therefore, except for a case where the preceding vehicle (a) has traveled while changing the traveling direction suddenly (for example, the preceding vehicle has traveled so as to deviate from the own vehicle traveling lane), and except for a case where the cutting-in vehicle is cutting in between the preceding vehicle (a) and the own vehicle, and the like, the "following-travel steering target vehicle candidate" and the "previous following-travel steering target vehicle" are highly likely to be the same preceding vehicle (a).

When the "following-travel steering target vehicle candidate" is a vehicle which is the same vehicle as the "previous following-travel steering target vehicle", the CPU makes a "No" determination at step 550 and proceeds to step 535 to specify the "following-travel steering target vehicle candidate" having a high possibility of being the preceding vehicle (a) which has been selected at step 525 as the "final following-travel steering target vehicle". Thereafter, the CPU sequentially executes the processes of step 540 and step 545. As a result, the following-travel steering control is performed in accordance with the traveling trajectory of the "preceding vehicle (a)" specified as the "final following-travel steering target vehicle".

In contrast, when the "following-travel steering target vehicle candidate" is a vehicle which is different from a vehicle specified as the "previous following-travel steering target vehicle", the CPU makes a "Yes" determination at step 550 and proceeds to step 555 to determine whether or not a duration time (hereinafter, also referred to as a "specifying duration time") for which the "previous following-travel steering target vehicle" continues being specified as the "final following-travel steering target vehicle" is longer than a predetermined time.

When the specifying duration time is equal to or shorter than the predetermined time, the accuracy of the traveling trajectory can not be determined because that traveling trajectory is too short. Furthermore, in this case, it is highly likely that the accuracy of the traveling trajectory generated based on the "following-travel steering target vehicle candidate" through specifying it as the "final following-travel steering target vehicle" is higher than the accuracy of the traveling trajectory generated based on the "previous following-travel steering target vehicle" through specifying it as the "final following-travel steering target vehicle".

Therefore, in this case, the CPU makes a "No" determination at step 555 and proceeds to step 535 to specify the "following-travel steering target vehicle candidate" which has been selected at step 525 as the "final following-travel steering target vehicle". Thereafter, the CPU executes sequentially the processes of step 540 and step 545. As a result, the following-travel steering control is performed in accordance with the traveling trajectory of the "following-travel steering target vehicle candidate" specified as the "final following-travel steering target vehicle".

In contrast, the specifying duration time is longer than the predetermined time, the CPU makes a "Yes" determination at step 555 and proceeds to step 560 to determine whether or not the traveling trajectory of the "previous following-travel steering target vehicle" is along the own vehicle traveling lane.

The CPU makes the determination of step 560, for example, as follows. The CPU executes another routine (not shown) other than this routine, thereby acquiring/obtaining the traveling trajectory of a "parallelly traveling vehicle". The parallelly traveling vehicle is a "preceding vehicle of the own vehicle", which travels in a lane (an adjacent lane) adjacent to the own vehicle traveling lane, and which has a change amount of that lateral position within the predetermined time is equal to or smaller than a threshold. The CPU determines whether or not the traveling trajectory of the "previous following-travel steering target vehicle" and the traveling trajectory of the "parallelly traveling vehicle" are parallel to each other.

More specifically, the CPU calculates "a change amount of a distance in the lane width direction per unit time between those two traveling trajectories" at a time point at which the "previous following-travel steering target vehicle" and the "parallelly traveling vehicle" were present at the predetermined positions, based on the traveling trajectories of those two vehicles. Then, when that change amount is equal to or smaller than a predetermined change amount, the CPU determines that the traveling trajectory of "the previous following-travel steering target vehicle" and the traveling trajectory of "the parallel vehicle" are parallel to each other. In this case, the CPU determines that the traveling trajectory of the "previous following-travel steering target vehicle" is along the own vehicle traveling lane.

In contrast, when the above change amount is greater than the predetermined change amount, the CPU determines that the traveling trajectory of the "previous following-travel steering target vehicle" and the traveling trajectory of the "parallelly traveling vehicle" are not parallel to each other. In this case, the CPU determines that the traveling trajectory of the "previous following-travel steering target vehicle" is not along the own vehicle traveling lane (for example, refer to Japanese Patent Application Laid-Open No. 2004-322916). It should be noted that when the traveling trajectory of the parallelly traveling vehicle is not acquired/obtained, the CPU regards the traveling trajectory of the "previous following-travel steering target vehicle" as a trajectory which is not along the own vehicle lane.

When the traveling trajectory of the "previous following-travel steering target vehicle" is determined to be not along the own vehicle traveling lane, the "previous following-travel steering target vehicle" should not be specified as the "following-travel steering target vehicle". Therefore, in this case, the CPU makes a "No" determination at step 560 and proceeds to step 535 to specify "the following-travel steering target vehicle candidate which has been selected at step 525" as "the final following-travel steering target vehicle". Thereafter, the CPU proceeds to step 540 and step 545 to sequentially execute the processes of step 540 and step 545.

In contrast, when the traveling trajectory of the "previous following-travel steering target vehicle" is determined to be along the own vehicle traveling lane, the CPU makes a "Yes" determination at step 560 and proceeds to step 565 to determine whether or not "the following-travel steering target vehicle candidate" which has been selected at step 525 is a potential cutting-in vehicle (also referred to as a "predicted cutting-in vehicle") having a possibility of cutting in between "the own vehicle" and "the previous steering following vehicle".

More specifically, the CPU determines whether or not the following cutting-in determination condition is satisfied at step 565.

The cutting-in determination condition: a condition satisfied when the longitudinal distance Dfx(n1) of a "following-travel steering target vehicle candidate (n1)" is within a range between a longitudinal distance Dfx(=0) of the front-end of the own vehicle SV and a "longitudinal distance Dfx(n2)" of the "previous following-travel steering target vehicle (n2)".

That is, when "the following-travel steering target vehicle candidate" is an other vehicle (for convenience, also referred to as a "third vehicle") which travels in the front area of the own vehicle and the longitudinal distance of the third vehicle with respect to the own vehicle is smaller than "the longitudinal distance of the previous following-travel steering target vehicle (for convenience, also referred to as a "specific other vehicle") with respect to the own vehicle", the CPU specifies the third vehicle as the potential cutting-in vehicle.

When the cutting-in determination condition is satisfied, the CPU determines that "the following-travel steering target vehicle candidate" is "the predicted cutting-in vehicle". When the cutting-in determination condition is not satisfied, the CPU does not determine that "the following-travel steering target vehicle candidate" is "the predicted cutting-in vehicle".

When the cutting-in determination condition is not satisfied, the CPU makes a "No" determination at step 565 and proceeds to step 570 to specify "the previous following-travel steering target vehicle" as "the final following-travel steering target vehicle". Subsequently, the CPU sequentially executes the processes of step 540 and step 545. As a result, the steering control is performed in accordance with the traveling trajectory of the "final following-travel steering target vehicle" which is the preceding vehicle which is the same as the "previous following-travel steering target vehicle". Thereafter, the CPU proceeds to step 595 to tentatively terminate the present routine.

In contrast, when the cutting-in determination condition is satisfied, the CPU makes a "Yes" determination at step 565 and proceeds to step 575 to determine whether or not a lateral position Dfy(CV) of "the potential cutting-in vehicle CV which is the following-travel steering target vehicle candidate (n1)" selected at step 525 is close to the traveling trajectory of "the previous following-travel steering target vehicle".

More specifically, the CPU calculates "the distance Dsy in the lane/road width direction of the potential cutting-in vehicle CV" with respect to (from) the traveling trajectory of "the previous following-travel steering target vehicle" by using the above-described Expression (6) at step 575. The distance Dsy is the determination distance (distance for determination) Dsy(CV).

Furthermore, the CPU determines whether or not the determination distance Dsy is equal to or smaller than the following-travel steering control threshold Dtjath. It should be noted that the following-travel steering control threshold Dtjath is set to an appropriate value (for example, {"the vehicle width of the previous following-travel steering target vehicle"+"the vehicle width of the potential cutting-in vehicle"}×0.5) for this determination. When the determination distance Dsy is equal to or smaller than the steering following target control threshold Dtjath, the CPU determines that the lateral position Dfy(CV) of "the following-travel steering target vehicle candidate" is sufficiently close to the traveling trajectory of "the previous following-travel steering target vehicle". In contrast, when the determination distance Dsy is greater than the following-travel steering control threshold Dtjath, the CPU determines that the lateral position Dfy(CV) is not close to the traveling trajectory of "the previous following-travel steering target vehicle".

When the lateral position Dfy(Cv) of "the following-travel steering target vehicle candidate" is not close to the traveling trajectory of "the previous following-travel steering target vehicle" (that is, Dsy(CV)>Dtjath), the CPU makes a "No" determination at step 575 to sequentially execute the processes of step 570, step 540, and step 545. As a result, the steering control is performed in accordance with the traveling trajectory of the "final following-travel steering target vehicle" which is the vehicle which is the same as the "previous following-travel steering target vehicle". Thereafter, the CPU proceeds to step 595 to tentatively terminate the present routine.

In contrast, when the lateral position Dfy(CV) of "the following-travel steering target vehicle candidate" is close to the traveling trajectory of "the previous following-travel steering target vehicle" (that is, Dsy(CV)≤Dtjath), the CPU makes a "Yes" determination at step 575 and proceeds to step 535 to specify the potential cutting-in vehicle CV which is "the following-travel steering target vehicle candidate" which has been selected at step 525 as the final following-travel steering target vehicle. This time point corresponds to the above-described second time point. Thereafter, the CPU sequentially executes the processes of step 540 and step 545. As a result, the steering control starts the steering control in accordance with the traveling trajectory of the potential cutting-in vehicle CV. Thereafter, the CPU proceeds to step 595 to tentatively terminate the present routine.

Next, the ACC routine shown in FIG. 6 will be described. The CPU is configured to execute the routine shown in FIG. 6, every time a predetermined time elapses. Therefore, the CPU starts processing from step 600 shown in FIG. 6 and proceeds to step 605 to determine whether or not the performing condition of the ACC is satisfied. Hereinafter, the performing condition of the ACC is referred to as an "ACC performing condition".

The ACC performing condition is satisfied when both of the following conditions 4 and 5 are satisfied, for example.

The condition 4 is a condition satisfied when performing of the following-travel inter-vehicle-distance control (ACC) is being selected through the operation of the operation switch 18.

The condition 5 is a condition satisfied when the vehicle speed SPD is equal to or greater/higher than the predetermined lower limit vehicle speed and is equal to or smaller/lower than the predetermined upper limit vehicle speed.

When the ACC performing condition is not satisfied, the CPU makes a "No" determination at step 605 and directly proceeds to step 695 to tentatively terminate the present routine. In this case, the inter-vehicle-distance control is not performed.

In contrast, the ACC performing condition is satisfied, the CPU makes a "Yes" determination at step 605 and proceeds to step 610 to determine whether or not the preceding vehicle is present, similarly to step 510.

When the preceding vehicle is not present, the CPU makes a "No" determination at step 610 and proceeds to step 615 to determine a target acceleration Gtgt necessary for causing the actual vehicle speed of the own vehicle to become equal to the predetermined target vehicle speed.

Next, the CPU proceeds to step 620 to control the engine actuators 31 by using the engine ECU 30 and if necessary, control the brake actuator 41 by using the brake ECU 40 such that the actual acceleration of the own vehicle becomes equal to the target acceleration Gtgt. For example, the actual acceleration is "a change amount of the vehicle speed SPD per unit time" or "a detection value of the acceleration sensor (not shown) detecting the acceleration of the own vehicle in a longitudinal direction". Thereafter, the CPU proceeds to step 695 to tentatively terminate the present routine.

When the preceding vehicle is present, the CPU makes a "Yes" determination at step 610 and proceeds to step 625 to acquire/obtain the longitudinal distance Dfx of the preceding vehicle, the lateral position Dfy of the preceding vehicle, the relative lateral speed Vfy of the preceding vehicle, and the like, similarly to step 520.

Thereafter, the CPU proceeds to step 630 to select "the inter-vehicle-distance target vehicle candidate" from one or more of the preceding vehicle(s), similarly to step 525. More specifically, the CPU predicts/extrapolates the traveling course of the own vehicle based on the vehicle speed SPD and the yaw rate YRt. Next, the CPU selects a preceding vehicle (n1) which is the closest to "the extrapolated traveling course of the own vehicle" in the lane width direction as "the inter-vehicle-distance target vehicle candidate", based on the lateral position(s) of the preceding vehicle(s). Therefore, "the inter-vehicle-distance target vehicle candidate" is the preceding vehicle which is the same as the vehicle selected as "the following-travel steering target vehicle candidate".

Next, the CPU proceeds to step 635 to determine whether or not the TJA performing condition is satisfied, similarly to step 505.

When the TJA performing condition is not satisfied, the CPU makes a "No" determination at step 635 and proceeds to step 640 to specify "the inter-vehicle-distance target vehicle candidate" which has been selected at step 625 as "the final inter-vehicle-distance target vehicle".

Next, the CPU proceeds to step 645 to determine the target acceleration Gtgt regarding the vehicle specified as the final inter-vehicle-distance target vehicle by using the above-described Expression (1) or the above-described Expression (2). Thereafter, the CPU proceeds to step 620 to control the engine actuators 31 and the brake actuator 41 in such a manner that the actual acceleration of the own vehicle becomes equal to the target acceleration Gtgt. Next, the CPU proceeds to step 695 to tentatively terminate the present routine.

In contrast, the TJA performing condition is satisfied at a time point at which the CPU executes the process of step 635, the CPU makes a "Yes" determination at step 635 and proceeds to step 650 to determine whether or not the preceding vehicle (hereinafter, referred to as a "previous inter-vehicle-distance target vehicle") which has been specified as the inter-vehicle-distance target vehicle in the previous calculation is present as the preceding vehicle at the present time point, similarly to step 530.

Here, it is assumed that the "previous inter-vehicle-distance target vehicle" is not present. In this case, the CPU makes a "No" determination at step 650 to sequentially execute step 640, step 645, and step 620. As a result, the "inter-vehicle-distance target vehicle candidate" which has been specified at step 630 is specified as the final inter-vehicle-distance target vehicle, and the inter-vehicle-distance control for following that specified vehicle is performed. Next, the CPU proceeds to step 695 to tentatively terminate the present routine.

On the other hand, when the "previous inter-vehicle-distance target vehicle" is present, the CPU makes a "Yes" determination at step 650 and proceeds to step 655 to determine whether or not the "inter-vehicle-distance target vehicle candidate" which has been selected at step 630 is a vehicle different from a vehicle indicated by "the inter-vehicle-distance target vehicle", similarly to step 550.

When "the inter-vehicle-distance target vehicle candidate" is a vehicle which is the same as a vehicle indicated by "the previous inter-vehicle-distance target vehicle", the CPU makes a "No" determination at step 655 and proceeds to step 640 to specify the "inter-vehicle-distance candidate" which is the same vehicle as the "previous inter-vehicle-distance" which has been selected at step 630 as the "final inter-vehicle-distance target vehicle". Next, the CPU sequentially executes step 645 and step 620. As a result, "the inter-vehicle-distance candidate" which has been specified at step 630 is specified as the "final inter-vehicle-distance target vehicle", and the inter-vehicle-distance control for following that specified vehicle is performed. Next, the CPU proceeds to step 695 to tentatively terminate the present routine.

When the "inter-vehicle-distance target vehicle candidate" is a vehicle which is different from a vehicle indicated by the "previous inter-vehicle-distance target vehicle" at the time point at which the CPU executes the process of step 655, the CPU makes a "Yes" determination at step 655 and proceeds to step 660 to determine whether or not the traveling trajectory of the "previous inter-vehicle-target vehicle" is along the own vehicle traveling lane. This traveling trajectory of the previous inter-vehicle-distance target vehicle is the same as the traveling trajectory of the previous following-travel steering target vehicle used at step 555 (that is, the traveling trajectory used in the TJA).

When the traveling trajectory of the "previous inter-vehicle-distance target vehicle" is not along the own vehicle traveling lane, the "previous inter-vehicle-distance target vehicle" should not be specified as the inter-vehicle-distance target vehicle. Therefore, in this case, the CPU makes a "No" determination at step 660 and sequentially executes step 640, step 645 and step 620. As a result, the "inter-vehicle-distance target vehicle candidate" which has been specified at step 630 is specified as the final inter-vehicle-distance target vehicle, and the CPU performs the inter-vehicle-distance control for following that specified vehicle. Next, the CPU proceeds to step 695 to tentatively terminate the present routine.

When the traveling trajectory of the "previous inter-vehicle-distance target vehicle" is along the own vehicle traveling lane at the time point at which the CPU executes process of the step 660, the CPU makes a "Yes" determination at step 660 and proceeds to step 665 to determine whether or not the "inter-vehicle-distance target vehicle candidate" is the potential cutting-in vehicle (the predicted cutting-in vehicle) having a possibility of cutting in between the own vehicle and the "previous inter-vehicle-distance target vehicle", by determining whether or not the above-described cutting-in determination condition is satisfied. In this case, in the cutting-in determination condition, the "following-travel steering target vehicle candidate" is the same preceding vehicle as the "inter-vehicle-distance target vehicle candidate", and "the previous following-travel steering target vehicle" is the same preceding vehicle as "the previous inter-vehicle-distance target vehicle".

When the "inter-vehicle-distance target vehicle candidate" is not the potential cutting-in vehicle (that is, when the cutting-in determination condition is not satisfied), the CPU makes a "No" determination at step 665 and proceeds to step 670 to specify the "previous inter-vehicle-distance target vehicle" as the "final inter-vehicle-distance target vehicle". Thereafter, the CPU executes the processes of the step 645 and step 620. As a result, the inter-vehicle-distance control for following the "final inter-vehicle-distance vehicle" is performed. This final inter-vehicle-distance vehicle is the same preceding vehicle as the "previous inter-vehicle-distance target vehicle". Next, the CPU proceeds to step 695 to tentatively terminate the present routine.

In contrast, when the "inter-vehicle-distance target vehicle candidate" is the potential cutting-in vehicle (that is, when the cutting-in determination condition is satisfied), the CPU makes a "Yes" determination at step 665 and proceeds to step 675 to determine whether or not the lateral position Dfy(CV) of the "potential cutting-in vehicle CV which is the candidate of the inter-vehicle-distance target vehicle" is close to the traveling trajectory of "the previous inter-vehicle-distance target vehicle".

More specifically, the CPU calculates the "distance Dsy (that is, the determination distance Dsy) of the cutting-in vehicle CV in the lane/road width direction with respect to the traveling trajectory" at step 675 by using the above-described Expression (6) to determine whether or not the distance Dsy is equal to or smaller than the "inter-vehicle-distance control threshold Daccth which is greater than the following-travel steering control threshold Dtjath".

When the lateral position Dfy(CV) of the "inter-vehicle-distance target vehicle candidate" is greater than the inter-vehicle-distance control threshold Daccth, the CPU makes a "No" determination at step 675 to execute sequentially the processes of step 670, step 645, and step 620. As a result, the CPU performs the inter-vehicle-distance control for following the "final inter-vehicle-distance target vehicle" which is the same preceding vehicle as the "previous inter-vehicle-distance target vehicle". The CPU proceeds to step 695 to tentatively terminate the present routine.

In contrast, when the lateral position Dfy(CV) of "the inter-vehicle-distance target vehicle candidate" is equal to or smaller than the inter-vehicle-distance control threshold Daccth, the CPU makes a "Yes" determination at step 675 and proceeds to step 640 to specify the potential cutting-in vehicle CV which is the "inter-vehicle-distance target vehicle candidate" which has been selected at step 630 as the final inter-vehicle-distance target vehicle. This time point corresponds to the above-described first time point. As described above, the inter-vehicle-distance control threshold Daccth is greater than the following-travel steering control threshold Dtjath. Therefore, a time point (the first time point) at which the CPU makes a "Yes" determination at step 675 is earlier than (prior to) a time point (the second time point) at which the CPU makes a "Yes" determination at step 575. Thereafter, the CPU sequentially executes the processes of step 645 and step 620. As a result, the inter-vehicle-distance control for following the potential cutting-in vehicle CV is performed. Then, the CPU proceeds to step 695 to tentatively terminate the present routine.

According to the above-described first embodiment apparatus, the following effects are obtained. That is, according to the first embodiment apparatus, when the cutting-in vehicle is present, each of the timing (that is, the first time point) at which the potential cutting-in vehicle is specified as the inter-vehicle-distance target vehicle and the timing (that is, the second time point) at which the potential cutting-in vehicle is specified as the following-travel steering target vehicle can be an appropriate timing. As a result, the first embodiment apparatus can cause the own vehicle to travel in the own vehicle traveling lane stably.

Second Embodiment Apparatus

Next, a vehicle driving support apparatus (hereinafter, referred to as the "second embodiment apparatus" in some cases) according to the present invention will be described. The second embodiment apparatus differs from the first embodiment apparatus only in the following respects.

Figure 6:
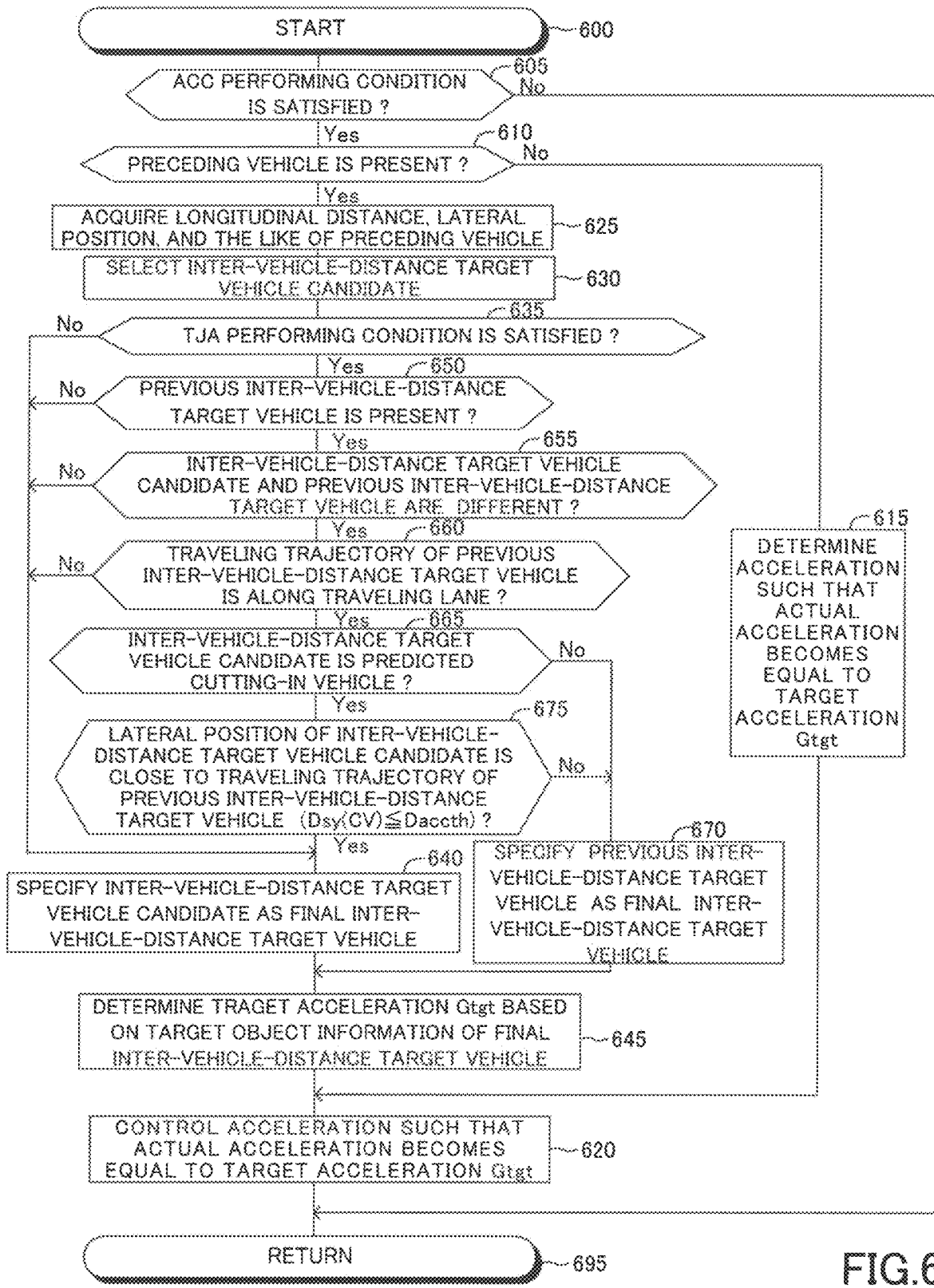
FIG. 6 is a flowchart showing a routine executed by the CPU of the driving support ECU provided on the vehicle driving support apparatus according to the first embodiment shown in FIG. 1.
Figure 7:
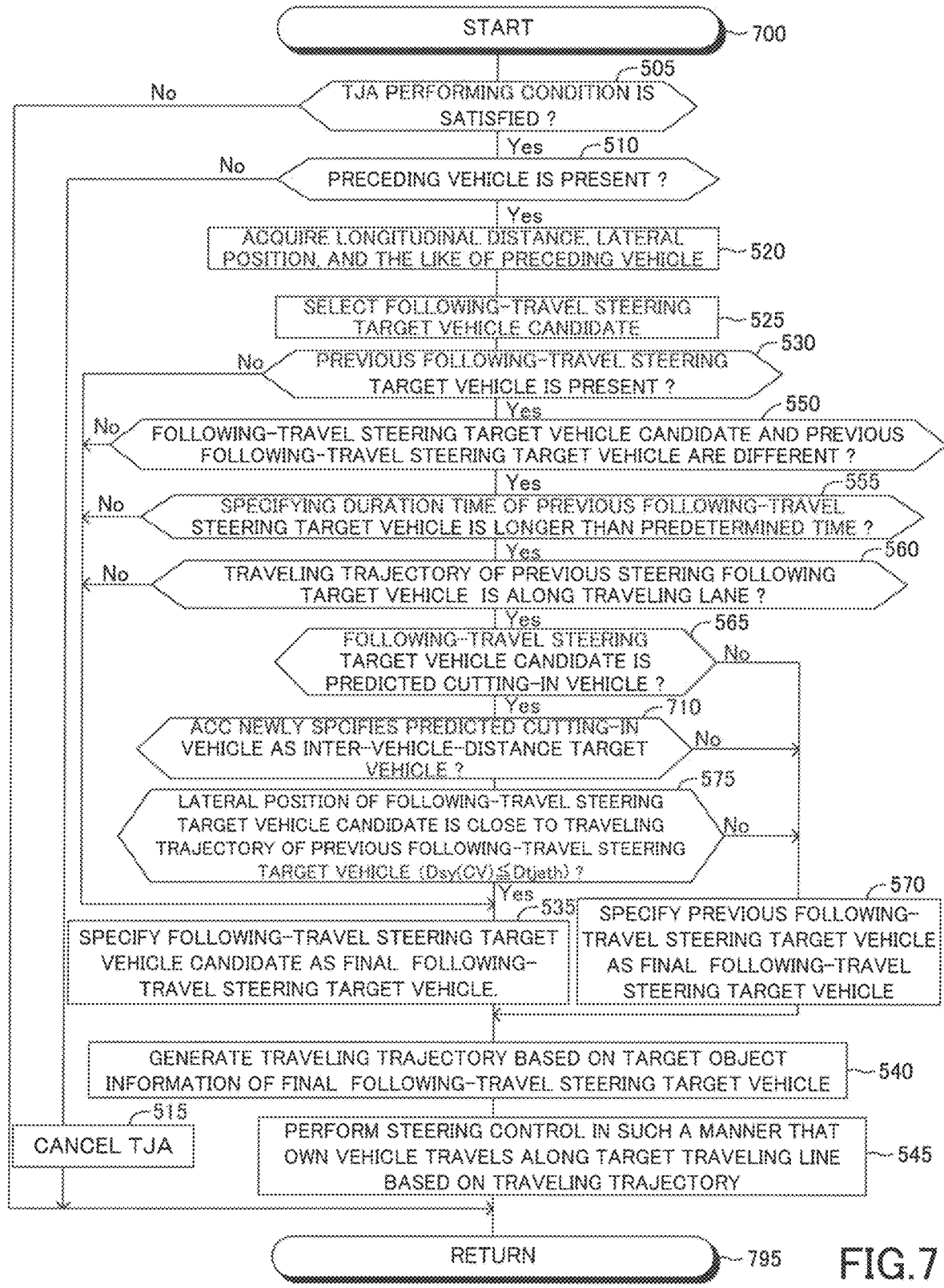
FIG. 7 is a flowchart showing a routine executed by a CPU of a driving support ECU provided on a vehicle driving support apparatus according to a second embodiment.
Figure 8:
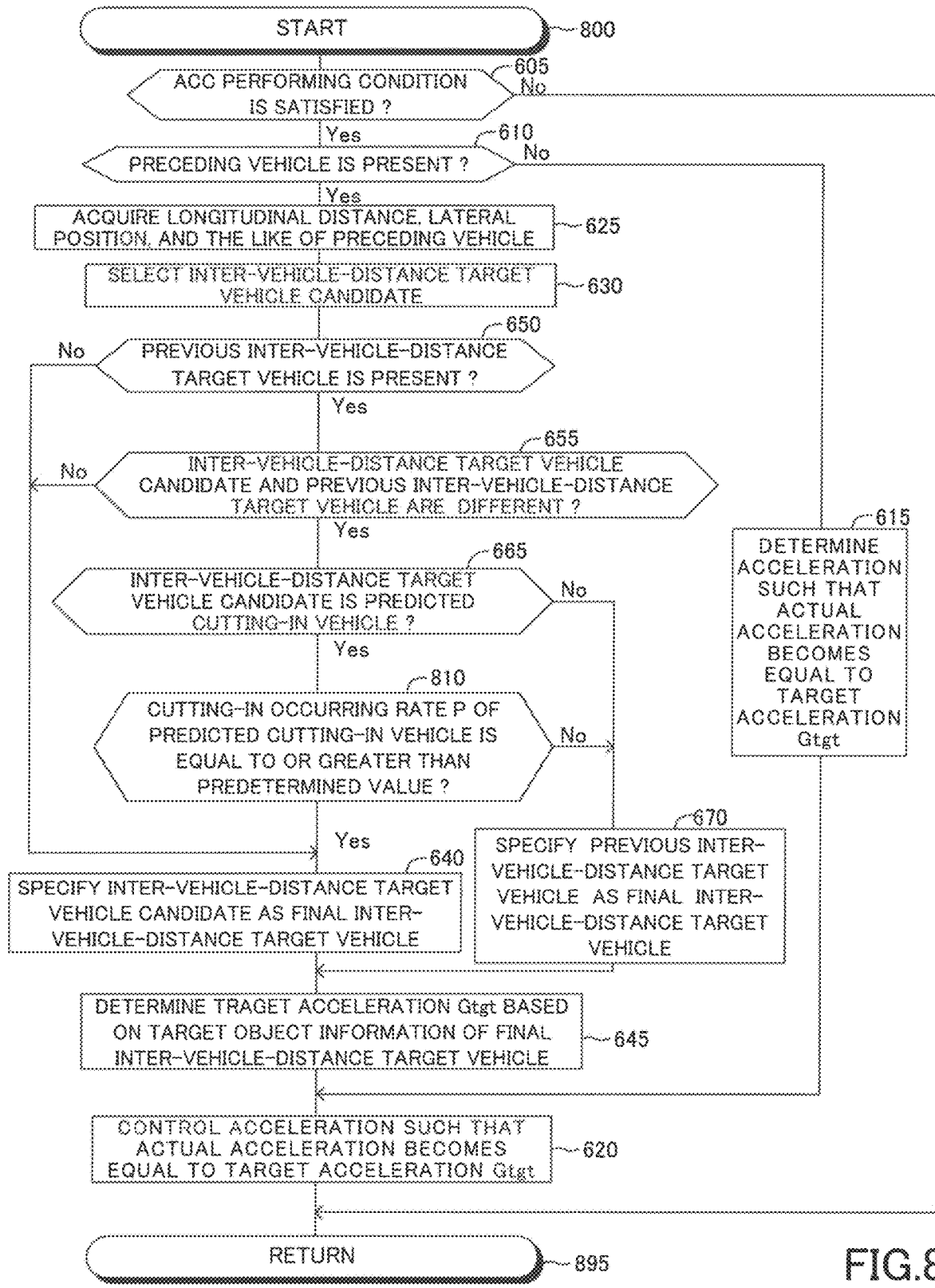
FIG. 8 is a flowchart showing a routine executed by the CPU of the driving support ECU provided on the vehicle driving support apparatus according to the second embodiment.

The second embodiment is configured to execute a TJA routine shown by a flowchart in FIG. 7 in place of the TJA routine shown in FIG. 5, and an ACC routine shown by a flowchart in FIG. 8 in place of the ACC routine shown in FIG. 6.

When the following-travel steering control (TJA) and the inter-vehicle-distance control (ACC) are performed in parallel, the second embodiment apparatus which executes those routines determines whether or not the potential cutting-in vehicle is specified as the following-travel steering target vehicle after a condition that the potential cutting-in vehicle (the predicted cutting-in vehicle) is specified as a new inter-vehicle-distance target vehicle has been satisfied. Therefore, similarly to the first embodiment apparatus, the second embodiment apparatus specifies the potential cutting-in vehicle as the following-travel steering target vehicle at a timing (the second time point) which is after a timing (the first time point) at which it specifies the potential cutting-in vehicle as the inter-vehicle-distance target vehicle. Hereinafter, this difference will be mainly described.

The CPU of the second embodiment apparatus is configured to execute the TJA routine shown by the flowchart in FIG. 7, every time a predetermined time elapses. It should be noted that the same numerals as the numerals assigned to the steps in FIG. 5 are assigned to the steps in FIG. 7 which cause the CPU to execute the same processes as the processes of the steps shown in FIG. 5, and descriptions of these steps are omitted as appropriate.

The routine shown in FIG. 7 differs from the routine shown in FIG. 5 only in that step 710 described later is inserted between steps 565 and 575 of the routine shown in FIG. 5. Therefore, the process of step 710 will be mainly described.

The CPU proceeds to step 710 to determine whether or not the "potential cutting-in vehicle CV which is the following-travel steering target vehicle candidate (n1)" has been specified as the inter-vehicle-distance target vehicle for the ACC (refer to a "Yes" determination at step 810 shown in FIG. 8, and step 640 shown in FIG. 8).

When the potential cutting-in vehicle CV has not been specified as the inter-vehicle-distance for the ACC, the CPU makes a "No" determination at step 710 to sequentially execute the processes of step 570, step 540, and step 545. As a result, the steering control is performed in accordance with the traveling trajectory of the "final following-travel steering target vehicle" which is the same vehicle as the "previous following-travel steering target vehicle". Thereafter, the CPU proceeds to step 795 to tentatively terminate the present routine.

In contrast, when the potential cutting-in vehicle CV has been specified as the inter-vehicle-distance target vehicle for the ACC, the CPU makes a "Yes" determination at step 710 and proceeds to step 575 to determine whether or not the determination distance Dsy of the potential cutting-in vehicle CV is equal to or smaller than the following-travel steering control threshold Dtjath.

When the determination distance Dsy(CV) is greater than the following-travel steering control threshold Dtjath, the CPU makes a "No" determination at step 575 to proceed to step 570, and then proceeds to step 540 and step 545. As a result, the potential cutting-in vehicle CV is not specified as the final following-travel steering target vehicle, and thus, the steering control is performed in accordance with the traveling trajectory of the "final following-travel steering target vehicle" which is the same vehicle as the "previous following-travel steering target vehicle".

On the other hand, when the determination distance Dsy(CV) is equal to or smaller than the following-travel steering control threshold Dtjath, the CPU makes a "Yes" determination at step 575 and proceeds to steps 535 to 545. As a result, the steering control in accordance with the traveling trajectory of the potential cutting-in vehicle CV starts to be performed. It should be noted that a time point at which the cutting-in vehicle CV has been specified as the final following-travel steering target vehicle corresponds to the above-described second time point.

Further, the CPU of the second embodiment apparatus is configured to execute the ACC routine shown by the flowchart in FIG. 8, every time a predetermined time elapses. The routine shown in FIG. 8 differs from the routine shown in FIG. 6 only in that steps 635 and 660 of the routine in FIG. 6 are omitted, and step 675 of the routine in FIG. 6 is replaced by step 810 described later. It should be noted that the same numerals as the numerals assigned to the steps shown in FIG. 6 are assigned to the steps shown in FIG. 8 which cause the CPU execute the same processes as the processes of the steps shown in FIG. 6, and descriptions of these steps are omitted as appropriate. Hereinafter, these differences will be mainly described.

When the CPU determines that the "inter-vehicle-distance target vehicle candidate" is the potential cutting-in vehicle (the predicted cutting-in vehicle), the CPU proceeds to step 810 to determine whether or not a cutting-in occurring probability P of that potential cutting-in vehicle is equal to or greater than a predetermined value (for example, 60%).

Figure 9:
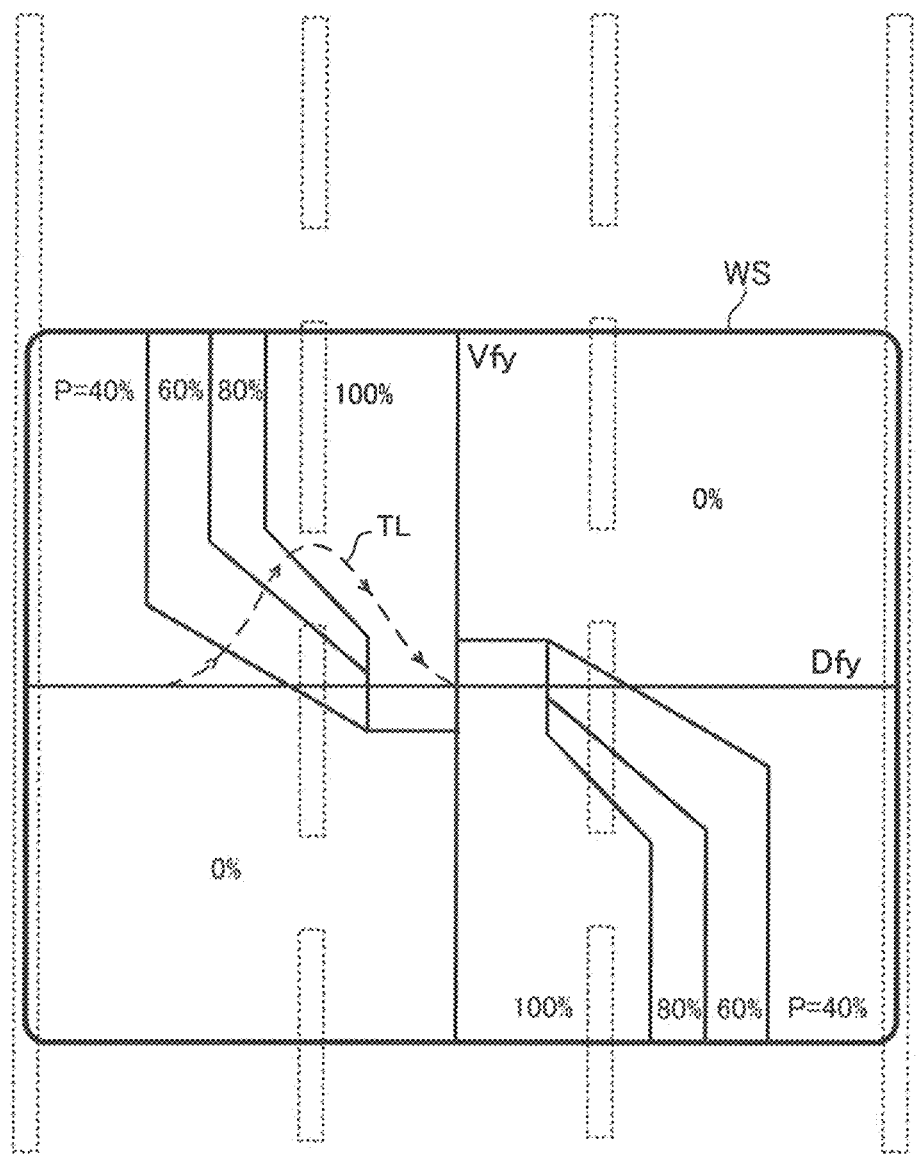
FIG. 9 is a lookup table (Map) referred by the CPU of the driving support ECU provided on the vehicle driving support apparatus according to the second embodiment.

That is, the CPU determines whether or not a predetermined condition for determining whether or not the potential cutting-in vehicle should be set as the inter-vehicle-distance target vehicle is satisfied at step 665. More specifically, the CPU obtains the cutting-in occurring probability P by applying "the lateral position Dfy and the relative lateral speed Vfy" of the potential cutting-in vehicle to an area Map WS shown in FIG. 9. For example, when a vehicle traveling in front of and to the left of the own vehicle cuts in between the own vehicle and the inter-vehicle-distance target vehicle, a trajectory formed by the lateral position Dfy and the relative lateral speed Vfy change as shown by a dashed line TL. The area Map WS is made/prepared in advance in consideration of such a trajectory and stored in the ROM. In General, the cutting-in occurring probability P obtained using the area Map WS becomes higher as a magnitude of the lateral position becomes closer to "0", and becomes higher as a magnitude |DFy| of the relative lateral speed becomes larger wherein the relative lateral speed is a speed having a component toward the center of the own vehicle in the vehicle width direction.

When the cutting-in occurring probability P of the potential cutting-in vehicle is smaller than a predetermined value (a threshold of cutting-in occurring probability), the CPU makes a "No" determination at step 810 to sequentially execute the processes of step 670, step 645, and step 620. As a result, the "previous inter-vehicle-distance target vehicle" is specified as the "final inter-vehicle-distance target vehicle", and the inter-vehicle-distance control for following that final inter-vehicle-distance target vehicle is performed. Next, the CPU proceeds to step 895 to tentatively terminate the present routine.

In contrast, when the cutting-in occurring probability P of the potential cutting-in vehicle is equal to or greater than the predetermined value, the CPU makes a "Yes" determination at step 810 to sequentially execute the processes of step 640, step 645, and step 620. As a result, the potential cutting-in vehicle which is the "inter-vehicle-distance target vehicle candidate" which has been selected at step 630 is specified as the "final inter-vehicle-distance target vehicle", and the inter-vehicle-distance control for following that specified final inter-vehicle-distance target vehicle is performed. It should be noted that a time point at which the potential cutting-in vehicle is specified as the "final inter-vehicle-distance target vehicle" corresponds to the above-described first time point. In this manner, the second embodiment apparatus uses "the lateral position and the relative lateral speed" without using the determination distance Dsy(CV) to thereby determine whether or not the predetermined condition is satisfied. Further, after the first time point, the above-described determination condition of step 710 is satisfied. Next, the CPU proceeds to step 895 to tentatively terminate the present routine.

According to the above-described second embodiment apparatus, the same effects as those of the first embodiment apparatus are achieved. That is, according to the the second embodiment apparatus, when the cutting-in vehicle is present, each of the timing (that is, the first time point) at which the potential cutting-in vehicle is specified as the inter-vehicle-distance target vehicle and the timing (that is, the second time point) at which the potential cutting-in vehicle is specified as the following-travel steering target vehicle can be an appropriate timing. As a result, the second embodiment apparatus can cause the own vehicle to travel in the own vehicle traveling lane stably.

Modified Examples

Although each of the embodiments of the present invention has been specifically described above, the present invention is not limited to the above embodiments, and various modified examples based on the technical idea within the scope of the present invention can be adopted.

For example, although the first embodiment apparatus is configured to perform the lane keeping control only while the following-travel inter-vehicle-distance control is being performed, it may be configured to perform the lane keeping control even while the following-travel inter-vehicle-distance control is not being performed.

For example, each of the first embodiment apparatus and the second embodiment apparatus may acquire/obtain the position information, the speed information, and the like of the one or more of the other vehicles including the following-travel steering target vehicle and the inter-vehicle-distance target vehicle through an inter-vehicle communication. More specifically, for example, the other vehicle may transmit the position information of the other vehicle acquired by using the navigation device of the other vehicle to the own vehicle SV together with a vehicle identification signal for identifying the other vehicle itself, and the own vehicle may acquire/obtain the position information of the following-travel steering target vehicle and/or the inter-vehicle-distance target vehicle based on the information transmitted from the other vehicle. Furthermore, in each of the first embodiment apparatus and the second embodiment apparatus, a method of generating the traveling trajectory is not limited to the above-described example, and various well-known methods can be adopted. That is, as long as the method of generating the traveling trajectory is a method capable of generating a curve which approximates the traveling trajectory (the preceding vehicle trajectory) of the following-travel steering target vehicle, the Karman filter needs not to be used. For example, each of the first embodiment apparatus and the second embodiment apparatus may collate/compare the actual preceding vehicle trajectory basic information with a pattern stored in advance in ROM, to thereby calculate/obtain the approximated curve of the preceding vehicle trajectory. Then, each of the first embodiment apparatus and the second embodiment apparatus may calculate/obtain Cv, CV', and the like based on that approximated curve.

In addition, when the CPU of the first embodiment apparatus has determined that "the TJA performing condition is not satisfied" at step 635 shown in FIG. 6, the first embodiment apparatus may execute the same processes as those at steps 650 to 665, and the process of step 810 shown in FIG. 8, to thereby determine whether or not the potential cutting-in vehicle can be specified as the inter-vehicle-distance target vehicle. Further, the CPU of the second embodiment apparatus may determine, at step 810 shown in FIG. 8, whether or not the magnitude |Dfy| of the lateral position Dfy of the potential cutting-in vehicle is equal to or smaller than the predetermined lateral distance, and the CPU may proceed to step 670 when the magnitude |Dfy| is greater than the predetermined lateral distance, and may proceed to step 640 when the magnitude |Dfy| is equal to or smaller than the predetermined lateral distance.

What is claimed is:

1. A vehicle driving support control apparatus comprising:
a peripheral monitoring sensor that acquires target object information including a longitudinal distance and a lateral position of each one or more of other vehicles with respect to an own vehicle, said other vehicles traveling in a front area of said own vehicle; and
an electronic control unit programmed to:
perform an inter-vehicle-distance control to specify a first vehicle from among one or more of said other vehicles as an inter-vehicle-distance target vehicle, and to control an acceleration of said own vehicle in such a manner that an inter-vehicle distance which is a longitudinal distance of said inter-vehicle-distance target vehicle with respect to said own vehicle is maintained at a predetermined inter-vehicle distance, and perform a following-travel steering control to specify a second vehicle from among one or more of said other vehicles as a following-travel steering target vehicle, and to generate a traveling trajectory of said following-travel steering target vehicle to control a steering angle of said own vehicle in such a manner that said own vehicle travels along a target traveling line determined based on said traveling trajectory, wherein, when said first vehicle specified as said inter-vehicle-distance target vehicle and said second vehicle specified as said following-travel steering target vehicle are the same specific other vehicle as each other, and there is a potential cutting-in vehicle having a possibility of cutting in between said own vehicle and said specific other vehicle, the ECU is programmed to:

newly specify said potential cutting-in vehicle as said inter-vehicle-distance target vehicle at a first time point in a cutting-in period from a time point at which said potential cutting-vehicle starts cutting in to a time point at which said potential cutting-vehicle finishes cutting in; and newly specify said potential cutting-in vehicle as said following-travel steering target vehicle at a second time point in said cutting-in period, wherein said second time point is set to arrive after said first time point arrives.

2. The vehicle driving support control apparatus according to claim 1, wherein, said electronic control unit is programmed to:

specify a third vehicle as said potential cutting-in vehicle, when a longitudinal distance of said third vehicle with respect to said own vehicle is smaller than a longitudinal distance of said specific other vehicle with respect to said own vehicle, wherein said third vehicle is a vehicle which is traveling in said front area of said own vehicle and which is one of said other vehicles other than said specific other vehicle;

newly specify said potential cutting-in vehicle as said inter-vehicle-distance target vehicle, when a first condition becomes satisfied, said first condition including a condition to be satisfied when a determination distance becomes equal to or smaller than a predetermined inter-vehicle-distance control threshold, wherein said determination distance is a distance in a lane width direction between said traveling trajectory of said specific other vehicle and said specified potential cutting-in vehicle; and newly specify said potential cutting-in vehicle as said following-travel steering target vehicle, when a second condition is satisfied, said second condition including a condition to be satisfied when said determination distance becomes equal to or smaller than a predetermined following-travel steering control threshold which is smaller than said inter-vehicle-distance control threshold.

3. The vehicle driving support control apparatus according to claim 1, wherein, said electronic control unit is programmed to:

specify a third vehicle as said potential cutting-in vehicle, when a longitudinal distance of said third vehicle with respect to said own vehicle is shorter than a longitudinal distance of said specific other vehicle with respect to said own vehicle, wherein said third vehicle is a vehicle which is traveling in said front area of said own vehicle and which is one of said other vehicles other than said specific other vehicle;

newly specify said potential cutting-in vehicle as said inter-vehicle-distance target vehicle, when said potential cutting-in vehicle satisfies a predetermined condition; and newly specify said potential cutting-in vehicle as said following-travel steering target vehicle, when a specific condition becomes satisfied after said potential cutting-in vehicle has already been newly specified as said inter-vehicle-distance target vehicle, said specific condition including a condition to be satisfied when a determination distance becomes equal to or smaller than a predetermined following-travel steering control threshold, wherein said determination distance is a distance in a lane width direction between said traveling trajectory of said specific other vehicle and said specified potential cutting-in vehicle.

4. The vehicle driving support control apparatus according to claim 3, wherein, said peripheral monitoring sensor acquires a lateral relative speed of each one or more of said other vehicles with respect to said own vehicle, said other vehicles traveling in said front area of said own vehicle; and said electronic control unit is programmed to determine whether or not said predetermined condition is satisfied by using said lateral position of said potential cutting-in vehicle with respect to said own vehicle and said lateral relative speed of said potential cutting-in vehicle with respect to said own vehicle without using said determination distance.

* * * * *